(12) United States Patent
Tomita et al.

(10) Patent No.: US 8,249,359 B2
(45) Date of Patent: Aug. 21, 2012

(54) DETECTOR FOR DETECTING A PREDETERMINED IMAGE IN AN INPUT IMAGE, AND DETECTION METHOD AND INTEGRATED CIRCUIT FOR PERFORMING THE SAME

(75) Inventors: Hiroto Tomita, Fukuoka (JP); Ikuo Fuchigami, Fukuoka (JP)

(73) Assignee: Panasonic Corporation, Osaka (JP)

( * ) Notice: Subject to any disclaimer, the term of this patent is extended or adjusted under 35 U.S.C. 154(b) by 205 days.

(21) Appl. No.: 12/377,191

(22) PCT Filed: Apr. 11, 2008

(86) PCT No.: PCT/JP2008/000961
§ 371 (c)(1),
(2), (4) Date: Jun. 1, 2010

(87) PCT Pub. No.: WO2008/129875
PCT Pub. Date: Oct. 30, 2008

(65) Prior Publication Data
US 2010/0232712 A1    Sep. 16, 2010

(30) Foreign Application Priority Data
Apr. 13, 2007   (JP) .................... 2007-105605

(51) Int. Cl.
*G06K 9/62* (2006.01)

(52) U.S. Cl. ........................ 382/209; 382/181

(58) Field of Classification Search .......... 382/103, 382/107, 181, 209, 231
See application file for complete search history.

(56) References Cited

U.S. PATENT DOCUMENTS

| 6,532,301 | B1 * | 3/2003 | Krumm et al. ............... 382/170 |
| 2005/0069208 | A1 | 3/2005 | Morisada |
| 2005/0123201 | A1 | 6/2005 | Nakashima et al. |
| 2005/0152580 | A1 * | 7/2005 | Furukawa et al. ............ 382/103 |
| 2005/0152603 | A1 | 7/2005 | Bober |
| 2006/0029276 | A1 * | 2/2006 | Nagahashi et al. .......... 382/173 |

(Continued)

FOREIGN PATENT DOCUMENTS

CN          1614622       5/2005

(Continued)

OTHER PUBLICATIONS

International Search Report issued May 27, 2008 in the International (PCT) Application of which the present application is the U.S. National Stage.

(Continued)

*Primary Examiner* — Bhavesh Mehta
*Assistant Examiner* — Edward Park
(74) *Attorney, Agent, or Firm* — Wenderoth, Lind & Ponack, L.L.P.

(57) ABSTRACT

A detector detects a specified image in an input image. The detector includes an area determination unit for determining, in the input image, a detection target area in which the specified image potentially exists, a setting unit for setting positions of a plurality of matching target ranges substantially in the detection target area, each of the matching target ranges being a predetermined size, so that the matching target ranges cover the detection target area, and each matching target range overlaps a neighboring matching target range by a predetermined overlap width, and a matching unit for detecting the specified image by matching a portion of the input image encompassed by each matching target range set by the setting unit and a template image for detecting the specified image.

7 Claims, 16 Drawing Sheets

U.S. PATENT DOCUMENTS

2007/0110321 A1    5/2007   Okada et al.
2010/0232712 A1    9/2010   Tomita et al.

FOREIGN PATENT DOCUMENTS

| | | |
|---|---|---|
| JP | 6-325162 | 11/1994 |
| JP | 2003-133601 | 5/2003 |
| JP | 2004-30629 | 1/2004 |
| JP | 2005-173787 | 6/2005 |
| JP | 2006-202184 | 8/2006 |
| JP | 2006-323779 | 11/2006 |
| JP | 2007-135115 | 5/2007 |
| WO | 2008/129875 | 10/2008 |

OTHER PUBLICATIONS

International Search Report issued Aug. 11, 2009 in International (PCT) Application No. PCT/JP2009/001847, corresponding to the present application.

Notice of Allowance mailed Jun. 21, 2012 in corresponding U.S. Appl. No. 12/664,735.

* cited by examiner

FIG. 3

| REDUCTION ID | REDUCTION RATIO | HORIZONTAL SIZE | VERTICAL SIZE |
|---|---|---|---|
| 0 | $(1/1.22)^0$ | 320 PIXELS | 240 PIXELS |
| 1 | $(1/1.22)^1$ | 262 PIXELS | 196 PIXELS |
| 2 | $(1/1.22)^2$ | 214 PIXELS | 160 PIXELS |
| 3 | $(1/1.22)^3$ | 175 PIXELS | 131 PIXELS |
| 4 | $(1/1.22)^4$ | 143 PIXELS | 107 PIXELS |
| 5 | $(1/1.22)^5$ | 117 PIXELS | 87 PIXELS |
| 6 | $(1/1.22)^6$ | 95 PIXELS | 71 PIXELS |
| 7 | $(1/1.22)^7$ | 77 PIXELS | 58 PIXELS |
| 8 | $(1/1.22)^8$ | 63 PIXELS | 47 PIXELS |
| 9 | $(1/1.22)^9$ | 51 PIXELS | 38 PIXELS |
| 10 | $(1/1.22)^{10}$ | 41 PIXELS | 31 PIXELS |
| 11 | $(1/1.22)^{11}$ | 33 PIXELS | 25 PIXELS |

FIG. 6

| REDUCTION ID | OVERLAP AMOUNT | HORIZONTAL MOVING DISTANCE | VERTICAL MOVING DISTANCE |
|---|---|---|---|
| 0 | 22 PIXELS | 298 PIXELS | 218 PIXELS |
| 1 | 27 PIXELS | 293 PIXELS | 213 PIXELS |
| 2 | 34 PIXELS | 286 PIXELS | 206 PIXELS |
| 3 | 42 PIXELS | 278 PIXELS | 198 PIXELS |
| 4 | 52 PIXELS | 268 PIXELS | 188 PIXELS |
| 5 | 64 PIXELS | 256 PIXELS | 176 PIXELS |
| 6 | 79 PIXELS | 241 PIXELS | 161 PIXELS |
| 7 | 96 PIXELS | 224 PIXELS | 144 PIXELS |
| 8 | 119 PIXELS | 201 PIXELS | 121 PIXELS |
| 9 | 146 PIXELS | 174 PIXELS | 94 PIXELS |
| 10 | 178 PIXELS | 142 PIXELS | 62 PIXELS |
| 11 | 218 PIXELS | 102 PIXELS | 22 PIXELS |

DETECTOR FOR DETECTING A PREDETERMINED IMAGE IN AN INPUT IMAGE, AND DETECTION METHOD AND INTEGRATED CIRCUIT FOR PERFORMING THE SAME

TECHNICAL FIELD

The present invention relates to image processing technology, and in particular to technology for detecting a predetermined image in an input image.

BACKGROUND ART

There is a known method for detecting, in an input image, a specified image (for example, an image of a face) that is smaller than the input image, by matching a template image that is a template for detecting the specified image to the input image. In this method, a template image of a predetermined size that is smaller than the square input image is moved gradually from the top left to the bottom right of the input image, and repeatedly matched to the input image. Therefore, an issue arises that a comparatively high-performance processor, a large capacity memory, or the like is necessary when attempting to detect the specified image in a short time period.

As a method for solving the above problem, an area (hereinafter referred to as a "detection target area") that is only a portion of the input image is set as the area for detecting the specified image, and the template image is only matched to the input image in the detection target area. For example, patent document 1 discloses technology using this method.

FIG. 14 is a functional block diagram of an image processing device pertaining to patent document 1.

This image processing device can be used for detecting a vehicle on an ordinary road, etc. The image processing device includes a cutout unit for generating a low resolution image from an image in the detection target area of a high-resolution image that is output by a high-resolution camera, and a detection unit for detecting the vehicle, etc. with use of the low resolution image.

Also, FIG. 15 shows the detection target area in the image processing device pertaining to patent document 1.

FIG. 15 shows the detection target area in the image (high-resolution image) output by the high resolution camera that is mounted so that two lanes moving vertically in the same direction are pictured. In this image processing device, the detection target area is divided into two equal ranges (hereinafter, these ranges is referred to as "matching target areas"), and each time a high-resolution image is sequentially output by the high-resolution camera, an alternate one of the matching target ranges is selected, and detection of the vehicle, etc. is performed with use of the image (the partial image) in the selected matching target area. Since the vehicle is only detected, etc. in the detection target area, even when the size of the input image (the high-resolution image) is comparatively large, this enables suppressing the throughput amount and causing processing to be performed by a processor, etc. that has comparatively low processing power.

Also, patent document 2 is an example of general technology for detecting the specified image by matching the input image and the template image.

FIG. 16 is a functional block diagram of a face detector pertaining to patent document 2.

The face detector includes a template size and input image scale conversion determination unit. The face detector converts (enlarges or reduces) the input image to generate a plurality of images, each of which has been converted according to a different reduction ratio, and then matches each generated image to the template image. This enables detecting the specified image in the input image, even when the size of the specified image in the input image is different from the size of the specified image in the template image.

Patent document 1: Japanese Patent Application Publication No. 2005-173787

Patent document 2: Japanese Patent Application Publication No. 2004-30629

DISCLOSURE OF THE INVENTION

Problems Solved by the Invention

However, generally moving objects are not limited to moving in a fixed path like a lane on an ordinary road, etc., and there are also cases in which a moving object moves to a position that straddles both matching target areas in the detection target area shown in FIG. 15. In such cases, since the entirety of the moving object is not included in either of the images (partial images) of the matching target areas, there are cases in which the moving image cannot be detected by a matching with the template image, even by combining the technologies of patent document 1 and patent document 2.

In order to solve the above problem, the size of the matching target area may be variable. However, this method is not considered preferable since hardware resources are wasted compared to a case in which the size of the matching target area is constant. When the size of the matching target area is constant, if the size of the detection target area is larger than the size of the matching target area, processing is necessary for dividing the detection target area into smaller areas, each of which is the size of the matching target area.

The present invention has been achieved in view of the above issues, and an aim thereof is to provide a detector that can more reliably detect a specified image included in the detection target area even when the size of the matching target area is constant.

Means to Solve the Problems

In order to solve the above problem, the detector pertaining to the present invention is a detector for detecting a specified image in an input image, including an area determination unit operable to determine, in the input image, a detection target area in which the specified image potentially exists; a setting unit operable to set positions of a plurality of matching target ranges substantially in the detection target area, each of the matching target ranges being a predetermined size, so that the matching target ranges cover the detection target area, and each matching target range overlaps a neighboring matching target range by a predetermined overlap width; and a matching unit operable to detect the specified image by matching a portion of the input image encompassed by each matching target range set by the setting unit and a template image for detecting the specified image.

In order to solve the above problem, the detection method of the present invention is a detection method used in a detector for detecting a specified image in an input image, including an area determination step of determining, in the input image, a detection target area in which the specified image potentially exists; a setting step of setting positions of a plurality of matching target ranges substantially in the detection target area, each of the matching target ranges being a predetermined size, so that the matching target ranges cover the detection target area, and each matching target range overlaps a neighboring matching target range by a predetermined overlap width; and a matching step of detecting the specified image by matching a portion of the input image encompassed by each matching target range set by the setting unit and a template image for detecting the specified image.

Also, in order to solve the above problem, the integrated circuit of the present invention is a detection integrated circuit used in a detector for detecting a specified image in an input image, including an area determination unit operable to determine, in the input image, a detection target area in which the specified image potentially exists; a setting unit operable to set positions of a plurality of matching target ranges substantially in the detection target area, each of the matching target ranges being a predetermined size, so that the matching target ranges cover the detection target area, and each matching target range overlaps a neighboring matching target range by a predetermined overlap width; and a matching unit operable to detect the specified image by matching a portion of the input image encompassed by each matching target range set by the setting unit and a template image for detecting the specified image.

Here, setting positions of a plurality of matching target ranges, each of which is a predetermined size, so that the matching target ranges cover the detection target area, indicates that the entire area of the detection target area is encompassed by the matching target ranges. Also, the template image indicates a template image for detecting the specified image.

Effects of the Invention

Since the positions of the matching target ranges are set so that each matching target range overlaps a neighboring matching target range by a predetermined overlap width, there is an increased possibility of the detector having the above structure pertaining to the present invention detecting a specified image that is partially included in each of a plurality of matching target ranges, even when the specified image cannot be detected when the positions of the matching target ranges are set so that the matching target ranges do not overlap each other.

Also, the detector may further include a scaling ratio determination unit operable to determine a ratio for the portion of the input image encompassed by each matching target range, wherein the setting of the position of each matching target range by the setting unit may be performed so that the overlap width corresponds to the ratio determined by the scaling ratio determination unit, and the matching of the portion of the input image encompassed by each matching target range and the template image may be performed after a size of the portion of the input image encompassed by the matching target range has been changed according to the ratio determined by the scaling ratio determination unit.

Accordingly, since the overlap width corresponds to the ratio determined by the scaling ratio determination unit, the detector pertaining to the present invention can detect the specified image more efficiently than a case in which the overlap width is arbitrary.

Also, the detection target area may be a square area that is a portion of the input image, each matching target range may be a square area that is a portion of the detection target area, and the ratio for the portion of the input image encompassed by each matching target range may be one of a plurality of reduction ratios, and the detector may further include: a storage unit operable to store therein information indicating, for each reduction ratio, the overlap width corresponding to the reduction ratio, wherein the determination of the ratio by the scaling ratio determination unit and the setting of the position of each matching target range by the setting unit may be performed in accordance with the information stored in the storage unit, and the matching unit may include a reduction unit operable to, for each reduction ratio determined by the scaling ratio determination unit, reduce the portion of the input image by the reduction ratio.

According to this structure, since the overlap width that each matching target range overlaps a neighboring matching target range is stored for each reduction ratio, and the position of each matching target range is set accordingly, the detector pertaining to the present invention can perform higher-speed processing compared to a case in which the positions of the matching target areas are calculated on a case-by-case basis.

Also, since for each reduction ratio determined by the scaling ratio determination unit, an image reduced by the reduction ratio is matched to the template image, the detector pertaining to the present invention can detect a specified image having a different size from the template image without using a plurality of template images.

Also, the detector may further include a second reduction unit operable to reduce the input image to a same size as the matching target range, thus generating a reduced input image; and a second matching unit operable to detect the specified image by matching the reduced input image and the template image.

According to this structure, since the specified image is detected by matching a reduced input image, generated by reducing the input image to a same size as the matching target range, to the template image, the detector can detect a specified image that fills the entire input image.

Also, the detector may include a detection unit operable to detect, in the input image, an area in which a moving object is shown, wherein the area determination unit may perform the determining of the detection target area based on the area detected by the detection unit.

According to this structure, since the area in which the moving object is detected in the input image, that is, an area having a high possibility of including the specified image, is determined to be the detection target area, the detector pertaining to the present invention can detect the specified image more efficiently.

Also, the detector may further include an image input unit operable to receive, in an order of being captured, input of a plurality of input images sequentially captured by an external camera, wherein the area determination unit, treating a predetermined number of the plurality of input images sequentially captured by the external camera as one unit, may determines an entire area of an input image that is first in the order in each unit to be the detection target area, and when the specified image is detected by the matching unit in the input image that is first in the order, the detection target area of a subsequent input image in the order may be determined to include an area that is in an identical position as the area in which the specified image has been detected in the input image that is first in the order.

According to this structure, since when the entire area of the input image is determined to be the detection target area and the specified image is detected, the detection target area of a subsequent input image is determined to include an area that is in an identical position as the area in which the specified image has been detected, the detector pertaining to the present invention can detect the specified image more efficiently in the area having the high possibility of including the specified image.

BRIEF DESCRIPTION OF THE DRAWINGS

FIG. 3 shows exemplary correlations between reduction IDs and reduction ratios;

FIG. 6 shows exemplary overlap amounts and moving distances for the matching target areas;

DESCRIPTION OF THE CHARACTERS

Figure 1:
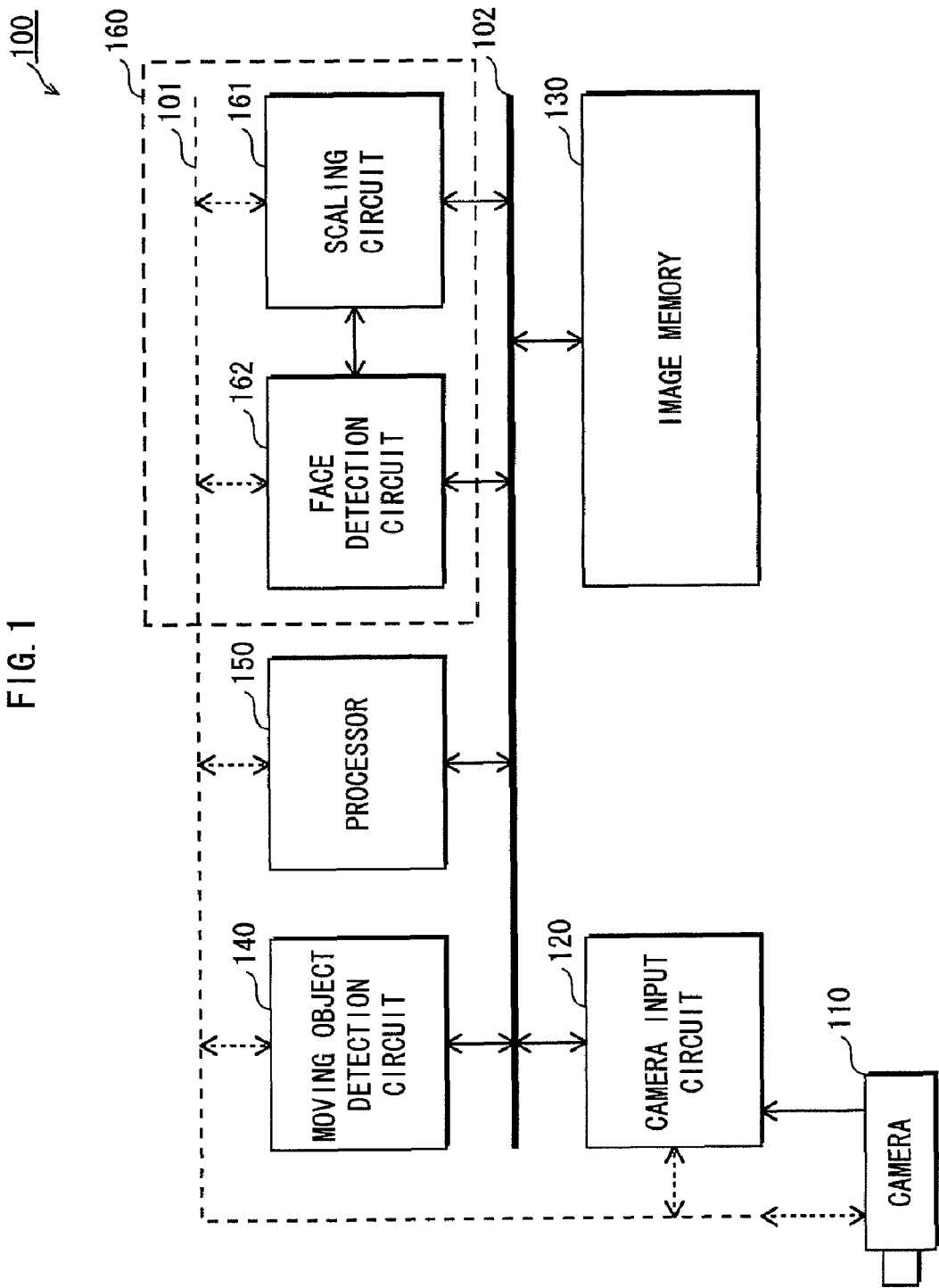
FIG. 1 is a functional block diagram of an image processing device 100.

100, 200 image processing device
101 processor bus
102 memory bus
110 camera
120 camera input circuit
130 image memory
140 moving object detection circuit
150 processor
160, 210 face detector
161, 211 scaling circuit
162 face detection circuit
300 semiconductor integrated circuit

BEST MODE FOR CARRYING OUT THE INVENTION

As an embodiment of a detector pertaining to the present invention, a face detector is described below with reference to the drawings.

Embodiment 1

Overview

The face detector pertaining to embodiment 1 detects a face image that is less than or equal to a predetermined size (for example, QVGA size (320×240 pixels)) by processing a detection target area in units of the predetermined size. The detection target area is an area in which the face image is anticipated to exist.

The following describes the processing performed in units of the predetermined size by the face detector. Specifically, the face image is detected by setting the positions of a plurality of ranges (matching target areas) each having a predetermined size, so that the detection target area is covered by the matching target areas and each matching target area overlaps a neighboring matching target area by a predetermined width (hereinafter referred to as "overlap"), and matching, each time a matching target area is set, an image that is a reduction of the portion of the input image in the matching target area (hereinafter referred to as a "reduced image") to a template of the face image (hereinafter referred to as "template image").

If the matching target areas are formed by simply dividing the detection target area into areas of the predetermined size, a face image that is divided among a plurality of matching target areas cannot be detected. The reason is that a match with the template image cannot be obtained when only a portion of the face image is included in each of a plurality of matching target areas.

However, since the face detector described here sets the positions of the matching target areas so that portions (hereinafter referred to as "overlap areas") of the matching target areas overlap, even the above-described type of face image can be detected. Note that a description of the extent of overlap, that is, the respective widths of the overlap areas, is provided later.

Also, the face detector performs the above-described generation of reduced images by gradually changing the reduction ratio for each reduced image. Therefore, the face detector can detect a face image of a different size from the face image in the template image without needing to prepare template images having different sizes.

Structure

First, the following describes the structure of an image processing device 100 including a face detector 160 pertaining to the present embodiment.

FIG. 1 is a functional block diagram of the image processing device 100.

As shown in FIG. 1, the image processing device 100 includes a camera 110, a camera input circuit 120, an image memory 130, a moving object detection circuit 140, a processor 150, and a face detector 160. Data transfer between the processor 150 and the other constituent elements is performed via a processor bus 101. Also, access to the image memory 130 from the other constituent elements besides the camera 110 is performed via the memory bus 102.

The moving object detection circuit 140 corresponds to a detection unit in the present invention, the processor 150 corresponds to an area determination unit, a setting unit, and a scaling ratio determination unit, and the face detector 160 corresponds to the matching unit in the present invention.

Here, the camera 110 captures images at a predetermined frame rate, and transmits sequentially generated 4 VGA size (1280×960 pixels) image data (hereinafter referred to as "high-resolution image data") to the camera input circuit 120.

The camera input circuit 120 performs, on the high-resolution image data received from the camera 110, various types of filter processing for improving image quality, thereby generating filter-processed high-resolution image data, and causes the filter-processed high-resolution image data to be stored in the image memory 130. Upon causing the filter-processed high-resolution image data to be stored in the image memory 130, the camera input circuit 120 notifies the processor 150 that the high-resolution image data has been stored.

The image memory 130 is a continuous memory area for storing therein high-resolution image data.

According to an instruction from the processor 150, the moving object detection circuit 140 reads the high-resolution image data stored in the image memory 130, performs moving object detection processing, and outputs a result of the detection to the processor 150. If a moving object is detected, the detection result includes a coordinate value indicating the area in which the moving object was detected. Also, the detection of the moving object is performed by, for example, matching edge detection results of high-resolution image data that does not include a moving object and the high-resolution image data stored in the image memory 130.

The processor 150, by executing a control program stored in an internal memory that is not depicted, transmits control instructions to the entire image processing device 100 and instructions to various blocks in the device (for example, an instruction to the moving object detection circuit 140 to start moving object detection).

Also, the processor 150 determines the detection target area according to the coordinate included in the detection result received from the moving object detection circuit 140. The processor 150 also sets the matching target areas in the detection target area. When the matching target areas have been set, the processor 150 specifies the set matching target areas to the face detector 160. The method of determining the detection target area and the method of setting the matching target areas are described later. Also, when one of the set matching target areas is reduced, the processor 150 specifies the reduction ratio of the reduced matching target area to the face detector 160.

The face detector 160 detects a face image by matching the template image to a reduced image that is a portion of the input image in the matching target area specified by the processor 150 that has been reduced by the specified reduction ratio. The face detector 160 includes a scaling circuit 161 and a face detection circuit 162. The reason for using the reduced image for the matching is so that a face image having a different size from the size of the face image in the template image can be detected. Note that, although the reduction ratio specified by the processor 150 is described later, in some cases the reduction ratio is 1:1, and hereinafter, a case in which the reduction ratio is 1:1 (in other words, the reduced image is the same as the matching target area) is also included when referring to the "reduced image". Also, the scaling circuit 161 corresponds to the reduction unit in the present invention.

Here, the scaling circuit 161 reads, from the image memory 130, the portion of the input image in the matching target area specified by the processor 150, reduces the portion by the specified reduction ratio, thus generating a reduced reduction image, and transmits the reduced reduction image to the face detection circuit 162.

The face detection circuit 162 is a circuit that detects a face image by matching an image that is equal to or less than the size of the matching target area (for example QVGA size) to the template image.

More specifically, the face detection circuit 162 repeatedly matches the reduced image received from the scaling circuit 161 to the template image while moving the template image gradually from the upper left pixel to the bottom right pixel by a predetermined number of pixels each time, and transmits the result of each matching to the processor 150. Hereinafter, the predetermined number of pixels is referred to as a "thinning amount". When the thinning amount is 1, the template image is repeatedly matched to the matching target areas leaving no space between matched areas. When the thinning amount is larger than 1, spaces are left between matched areas, and each space is the same number of pixels as the thinning amount. This enables decreasing the throughput amount. Both the horizontal and vertical thinning amounts are "2" in the example described below.

Face Detection

Next, the following describes the face detection method used by the face detector 160.

Figure 2:
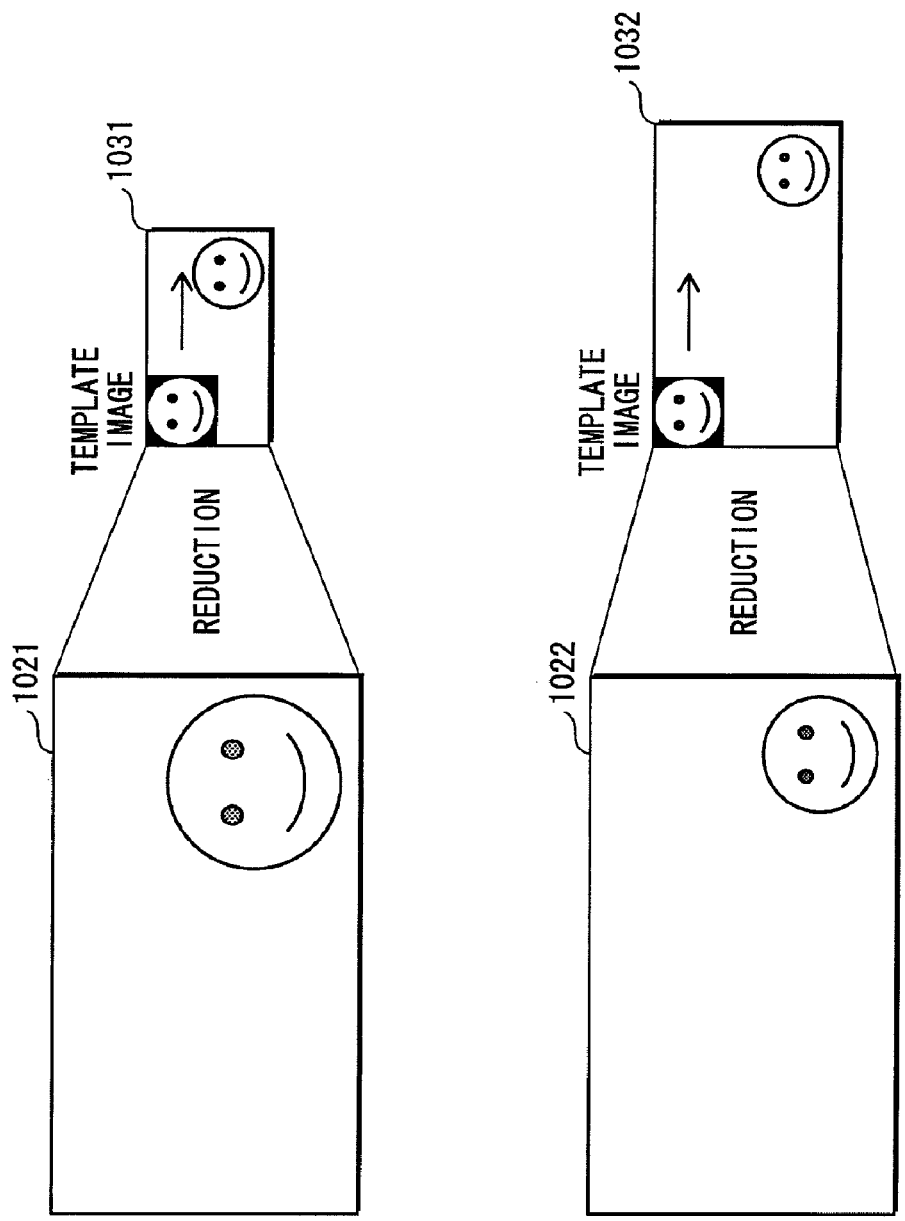
FIG. 2 illustrates a face detection method used by a face detector 160.

FIG. 2 illustrates the face detection method used by the face detector 160.

In FIG. 2, a matching target area 1021 and a matching target image 1022 each include a face image, and the face image included in the matching target area 1021 is larger than the face image included in the matching target area 1022.

In order to match the matching target area 1021 to a template image of a predetermined size (for example 24×24 pixels), the size of the face image included in the area must be reduced to the same extent as the size of the face image in the template image. A reduced image 1031 refers to the image after the image has been reduced.

The face detection circuit 162 detects the face image by repeatedly matching the template image to the reduced image while moving the template image over the reduced image 1031 from the top left pixel to the bottom right pixel by 2 pixels (the thinning amount) at a time.

Detection is performed similarly when detecting a face image in the matching target area 1022. The face detection circuit 162 repeatedly matches a reduced image 1032 that is a reduction of the matching target area 1022 to the template image.

Here, the size of the reduced image 1032 is larger than the size of the reduced image 1031. This indicates that the reduced image 1032 has been reduced to a lesser extent than the reduced image 1031. The size of the face image included in the matching target area 1022 is smaller than the size of the face image included in the matching target area 1021. Therefore, the size of the face image included in the matching target area 1022 can be reduced to a same degree of size as the face image of the template image, at a lower degree of reduction.

To detect the face image in the matching target area in this way, it is necessary to match the template image to the reduced image reduced to a reduction ratio according to the size of the face image included in the matching target area. However, since the size of the face image included in the matching target area is not known when actually attempting to detect the face image, the face detection circuit 162 detects the face image by repeatedly matching the template image to the reduced image while gradually changing the reduction ratio of the reduced image.

As shown in FIG. 3, for example, each reduction ratio for the reduced image can be determined by incrementally changing the reduction ratio used previously by an exponent of 1/1.22.

FIG. 3 shows exemplary correlations between reduction IDs and reduction ratios.

Here, a reduction ID refers to a piece of data used by the processor 150 for specifying, to the face detector 160, the reduction ratio of the matching target area. Note that the reduction ratios in FIG. 3 indicate ratios of enlargement, that is, a smaller value of the reduction ratio indicates that the image has been reduced to a greater degree. Also, in FIG. 3, the notation $(1/1.22)^n$ indicates $(1/1.22)$ raised to the nth power.

In FIG. 3, for example, the reduction ratio when the reduction ID is "0" is $(1/1.22)^0$, that is, 1:1, and when the portion of the input image in the matching target area is reduced by the corresponding reduction ratio, thus generating a reduced image, the horizontal size of the reduced image is "320 pixels", and the vertical size is "240 pixels". Also, when the reduction ID is "11", the reduction ratio is "$(1/1.22)^{11}$", the horizontal size of the reduced image is "33 pixels", and the vertical size is "25 pixels".

Note that since matching cannot be performed when the size of the reduced image is smaller than the size of the template image (in the above example, 24×24 pixels), in this example, the smallest reduction ratio is "11", that is, this reduction ratio indicates the greatest degree of reduction.

Determining the Detection Target Area

Next, the method of determining the detection target area by the processor 150 is described.

Figure 4:
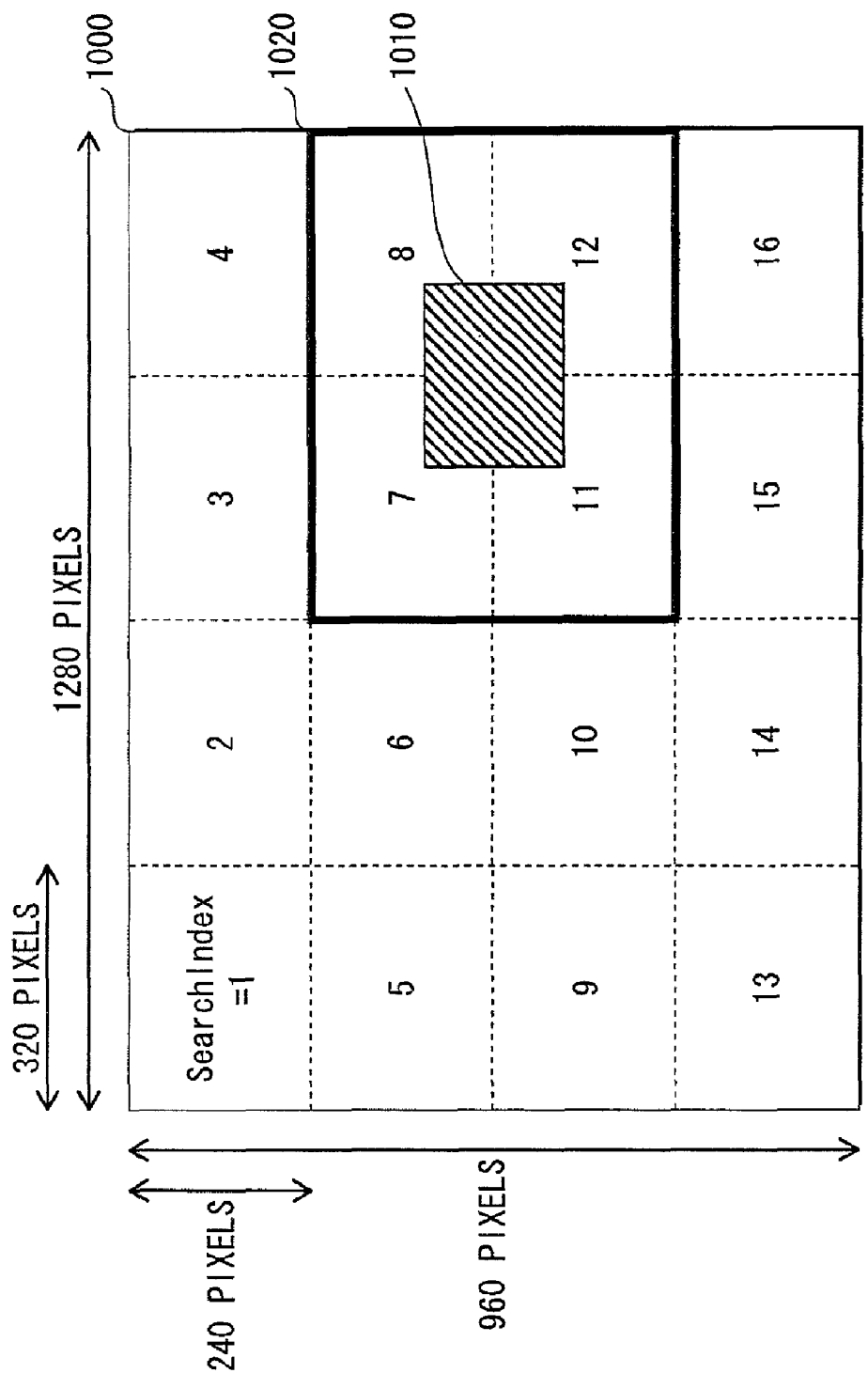
FIG. 4 illustrates a method of determining a detection target area.

FIG. 4 illustrates the method of determining the detection target area.

High-resolution data 1000 is high-resolution data stored in the image memory 130 at a certain point of time, and an area 1010 is an area in which the moving object detection circuit 140 has detected a moving object.

FIG. 4 shows 16 blocks created by logically dividing the high-resolution data into 4 horizontal rows and 4 vertical rows, and the number (hereinafter referred to as a "SearchIndex") inside each block is an information piece for identifying the block. Also, since each block has been created by dividing the 4 VGA-size high-resolution image data 1000 into 16 portions, each block is QVGA size.

The processor 150 determines that a detection target area 1020 is constituted from the blocks containing the area 1010 (the blocks identified by the SearchIndexes 7, 8, 11, and 12).

Upon determining the detection target area, in order to specify the determined detection target area, the processor 150 transmits the SearchIndexes corresponding to the detection target area to the face detector 160.

Setting the Matching Target Area

Next, the method of setting the matching target area by the processor 150 is described.

Figure 5:
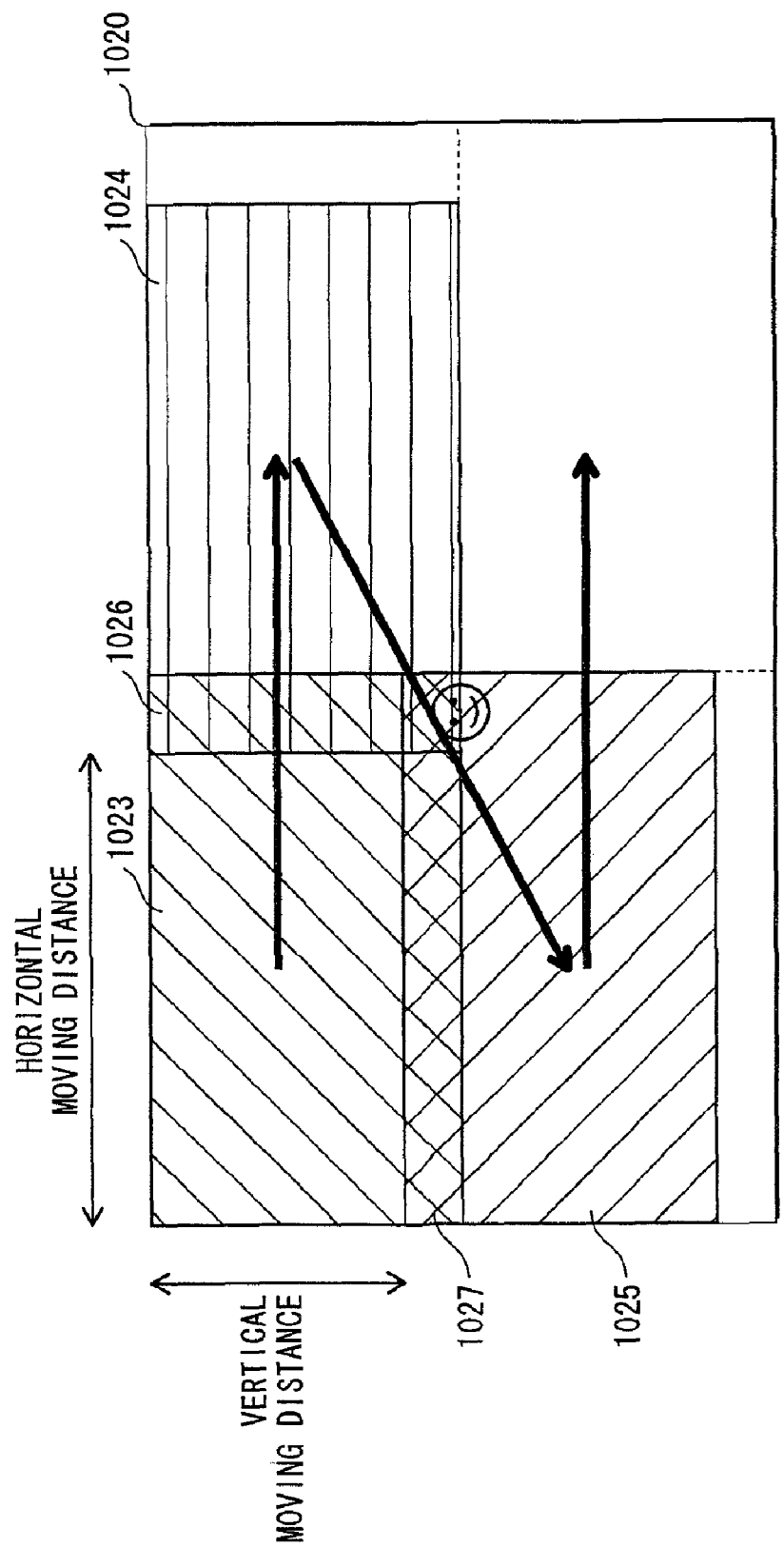
FIG. 5 illustrates a method of setting matching target areas.

FIG. 5 illustrates the method of setting the matching target area.

In FIG. 5, areas 1023 to 1025 indicate matching target areas in the detection target area 1020, and the size of each matching target area is QVGA size, the same size as each of the blocks described above.

Also, in FIG. 5, an area 1026 indicates the overlap area between the matching target areas 1023 and 1024, and area 1027 indicates the overlap area between the matching target areas 1023 and 1025.

The processor 150 provides the overlap areas between the matching target areas while setting the matching target areas from the top left to the bottom right of the determined detection target area 1020. In other words, in FIG. 5, the matching target areas are set in the order of 1023, 1024, 1025.

The reason for providing the overlap areas is to detect a face image spread across a plurality of blocks. For this reason, the size of the overlap area, that is the number of pixels to be overlapped (hereinafter referred to as an "overlap amount"), must be determined according to the size of the face image that is the detection target, and is calculated according to the following formulas.

Horizontal overlap amount=horizontal size of template image×1.22$^n$−k×1.22$^n$   [Formula 1]

Vertical overlap amount=vertical size of template image×1.22$^n$−m×1.22$^n$   [Formula 2]

Here, n indicates a value of one of the reduction IDs shown in FIG. 3, and k and m indicate horizontal and vertical thinning amounts, respectively. Also, in the present embodiment, the horizontal and vertical sizes of the template image are 24 pixels each.

Also, horizontal moving distances (number of pixels) and vertical moving distances (number of pixels) of each matching target area shown in FIG. 5 are calculated according to the following formulas, respectively.

Horizontal moving distance=horizontal size of matching target area−horizontal overlap amount   [Formula 3]

Vertical moving distance=vertical size of matching target area−vertical overlap amount   [Formula 4]

Here, in the example of the present embodiment, the horizontal size of the matching target area is 320 pixels, and the vertical size of the matching target area is 240 pixels.

When k=m=2, the results of calculating the overlap amount of the matching target area and the overlap amount area are as shown in FIG. 6.

FIG. 6 shows exemplary overlap amounts and moving distances for each matching target area.

For example, FIG. 6 indicates that when the reduction ID is "0", the overlap amount of the matching target areas is "22 pixels", the horizontal moving distance is "298 pixels", and the vertical moving distance is "218 pixels". Also, when the reduction ID is "11", the overlap amount of the matching target areas is "218 pixels", the horizontal moving distance is "102 pixels", and the vertical moving distance is "22 pixels".

When the face detection circuit 162 detects a face image by matching the reduced image and the template image, a higher degree of reduction (a smaller reduction ratio) of the reduced image indicates a larger face image included in the matching target area, and a higher degree of reduction, that is, a larger reduction ID, indicates a larger overlap amount.

Also, since the overlap amount is a size determined according to the size of the face image that can be detected by the face detection circuit 162 by matching the reduced image and the template image, matching can be performed efficiently without causing an unnecessary amount of overlap.

Data

Next, the following describes the arrangement of data pieces in the high-resolution data 1000 in the image memory 130.

Figure 7:
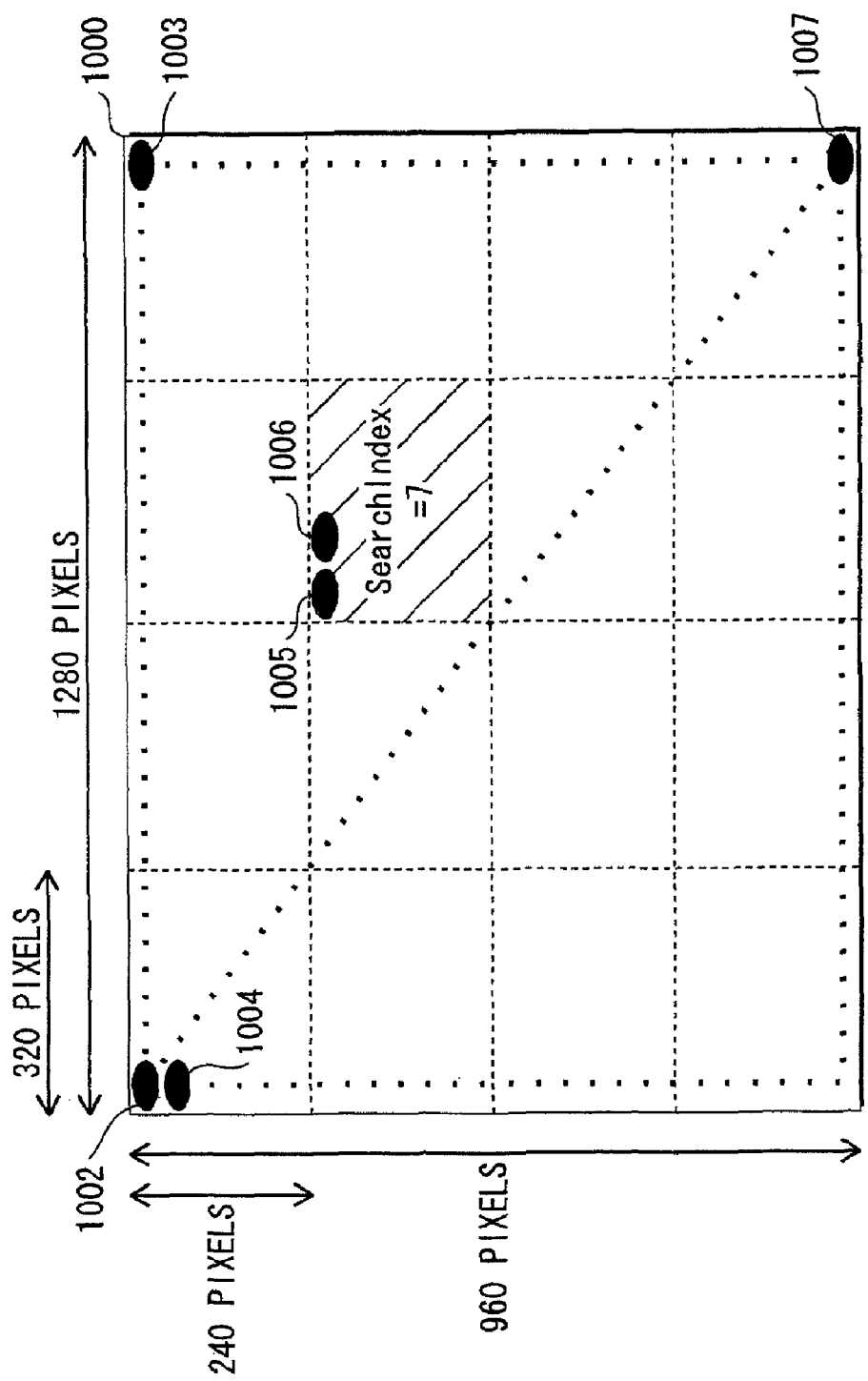
FIG. 7 illustrates an arrangement of data pieces in high-resolution data 1000 in an image memory 130.

FIG. 7 illustrates the arrangement of data pieces in the high-resolution data 1000 in the image memory 130.

As described above, the high-resolution data 1000 is constituted from VGA size (1280×960 pixels) image data pieces, and pixel value data of the pixels constituting the high resolution image data 1000 are stored in sequential areas of the image memory 130. In other words, the pixels shown in FIG. 7 are stored in sequential areas in the order of 1002, . . . , 1003, 1004, . . . , 1005, 1006, . . . , 1007.

Here, when an address value of an area in the image memory 130 in which a pixel 1002 is stored is expressed as BASE, address values of areas in which the pixel data values are stored are calculated with use of the following formula. Note that the horizontal size in the formulas is the horizontal size of the high resolution image data 1000, that is 1280 pixels, and the reference pixel refers to the pixel on the top left of the detection target area. Also, here, one address indicates an area in the image memory 130 where one pixel worth of image data is stored.

Address value=BASE+horizontal size×(Y coordinate of reference pixel+relative coordinate from reference pixel)+(X coordinate of reference pixel+relative X coordinate from reference pixel)   [Formula 5]

For example, when a pixel 1005 is set as the reference pixel, the address value of the area in the memory 130 in which a pixel 1006 that is immediately to the right of the reference pixel is stored is "BASE+1280×(240+0)+(640+1)".

This enables calculating the address value of the area in the memory 130 according to a relative coordinate from the reference pixel.

The processor 150 specifies the matching target area by transmitting, to the face detector 160, the relative coordinate value from the reference pixel for the pixel (hereinafter referred to as a "start point") on the top left of the set matching target area. With use of an address value calculated according to the received coordinate value, the scaling circuit 161 of the face detector 160 can read, from the image memory 130, the portion of the input image in the matching target area.

Operation

Next, the operation of the image processing device 100 that has the above-described structure and handles the above-described data is described below.

Figure 8:
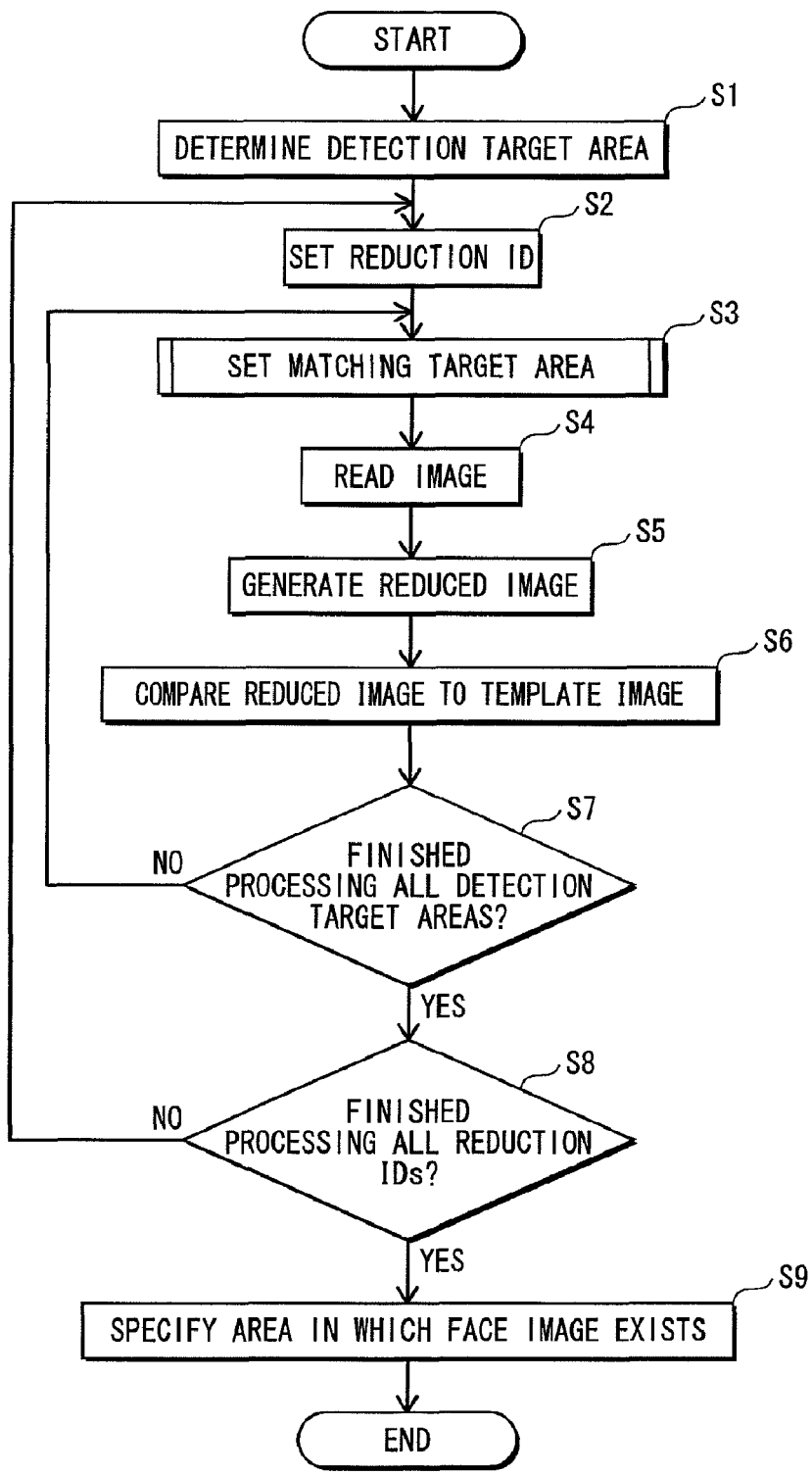
FIG. 8 is a flowchart showing operations of the image processing apparatus 100.

FIG. 8 is a flowchart showing operations of the image processing apparatus 100.

If the detection result received from the moving object detection circuit 140 includes a coordinate value indicating an area in which a moving object has been detected, in accordance with the coordinate value, the processor 150 determines that the blocks containing the moving object constitute the detection target area, and specifies the SearchIndexes of blocks corresponding to the determined detection target area to the face detector 160 (step S1).

Also, the processor 150 sets a reduction ID, and transmits the set reduction ID to the face detector 160 (step S2). More specifically, in the processing of step S2 that is the first processing after step S1, the reduction ID is set to an initial value (hereinafter, set as "1,1"), and thereafter, each time the processing of step S2 is performed, the reduction ID is set to decrease by one until reaching 0.

Also, the processor 150 sets one matching target area in the detection target area determined in step S1, and specifies, to the face detector 160, a coordinate value (the relative coordinate value from the reference pixel) of the start point of the set matching target area (step S3). The details of the processing for setting the matching target area are described later with reference to the flowchart shown in FIG. 9.

The scaling circuit 161 of the face detector 160, in accordance with the SearchIndexes specified in step S1 and the starting coordinate value specified in step S3, calculates, in accordance with Formula 5, the address value in the image memory 130 in which the portion of the input image in the matching target area is stored, and reads the portion of the input image in the matching target area from the image memory 130 (step S4).

Also, the scaling circuit 161 generates a reduced image that has been reduced at the reduction ratio corresponding to the reduction ID specified in step S2, and transmits the reduced image to the face detection circuit 162 (step S5).

The face detection circuit 162 repeatedly matches the template image to the reduced image received from the scaling circuit 161 while moving the template image over the reduced image from the top left pixel to the bottom right pixel by 2 pixels (the thinning amount) at a time, and transmits the result of the matching to the processor 150 (step S6). Note that if a face image is detected, the matching result transmitted to the processor 150 includes the coordinate value of the area in the reduced image in which the face image was detected.

The processor 150 determines whether the matching of step S6 has finished for the entire detection target area determined in step S1 (step S7).

In step S7, if the matching has not finished (step S7:NO), processing returns to step S3, and when the matching has finished (step S7:YES), the processor 150 judges, for all of the reduction IDs, whether the matching of step S6 has finished (step S8).

In step S8, if the matching has not finished (step S8:NO), the reduction ID is changed and processing returns to step S2 in order to perform matching processing, and when the matching has finished (step S8:YES), the processor 150 integrates all of the matching results transmitted by the face detection circuit 162 in step S6, specifies the area in which the face image exists in the high-resolution image (step S9), and ends face detection processing. As a method of specifying the area in which the face image exists, for example, the specification is done by converting the coordinate values included in the matching results into coordinate values in the high-resolution image data, and finding an average value of the coordinate values.

The processor 150 uses the results of this specification, for example, when causing the camera 110 to perform autofocus control for focusing on the area in which the face image exists, and when displaying the area in which the face image exists enclosed in a frame when displaying the high-resolution data captured by the camera 110 on a display (not depicted).

Next, the processing of step S3 is described in detail.

Figure 9:
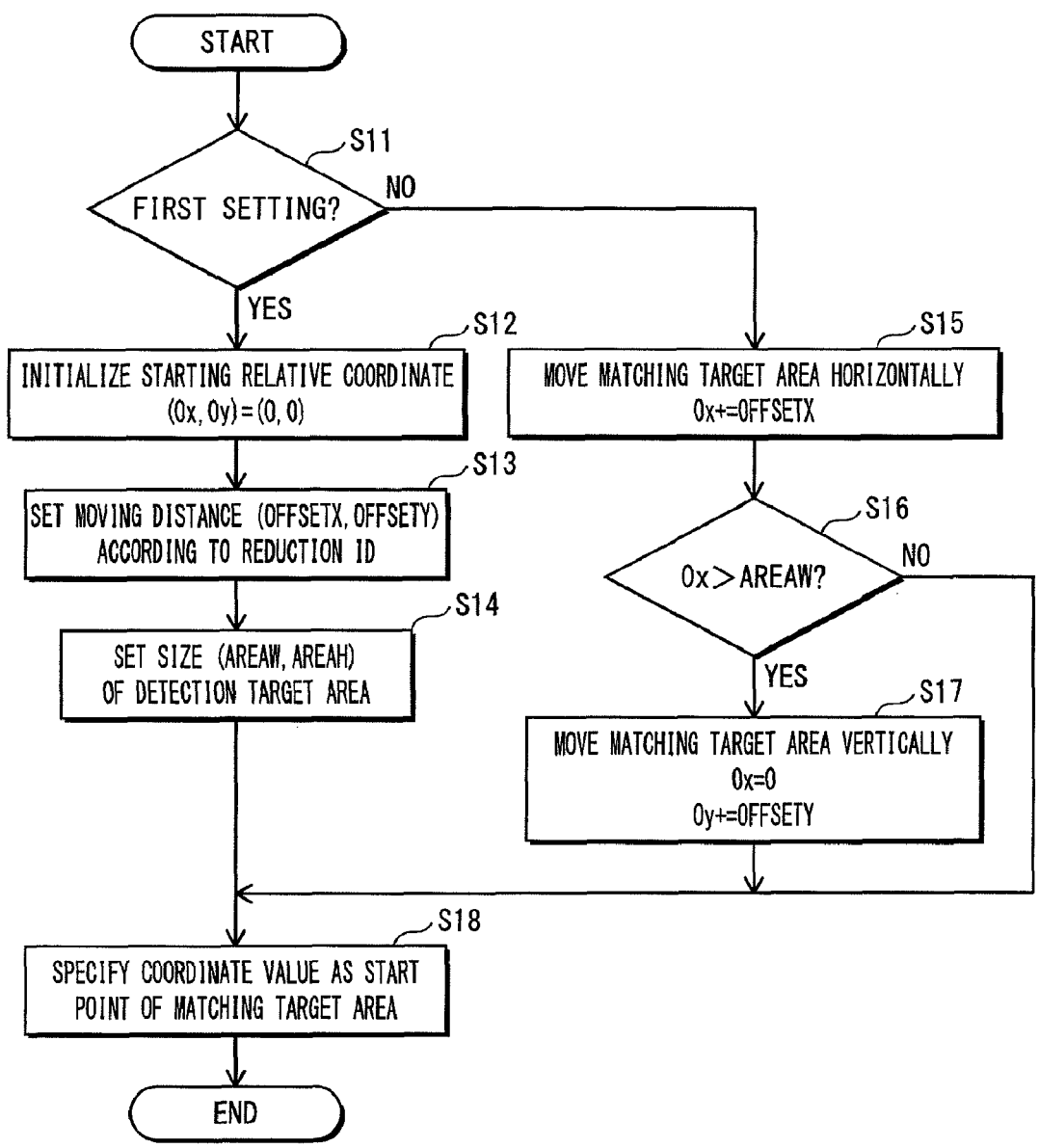
FIG. 9 is a flowchart showing setting processing of the matching target areas performed by a processor 150.

FIG. 9 is a flowchart showing setting processing performed by a processor 150 on the matching target area.

After determining the reduction ID in step S2, the processor 150 judges whether the current setting is the first matching target area setting (step S11), and if the judgment is affirmative (step S11:YES), the processor 150 sets the relative coordinate values (0x,0y) from the reference pixel of the detection target area for the start point of the matching target area to (0,0) (step S12).

The processor 150 calculates the moving distance (OFFSETX, OFFSETY) corresponding to the reduction ID set in step S2 according to Formula 3 and Formula 4 (step S13).

Also, the processor 150 calculates the size (AREAW,AREAH) of the detection target area (step S14), and processing proceeds to step S18.

Also, in step S11, if not the first setting (step S11:NO), the processor 150 causes the x coordinate (0x) of the start point of the matching target area to move the distance of OFFSETX calculated in step S13 (step S15), and judges whether the x coordinate (0x) of the start point of the matching target area is larger than the horizontal size (AREAW) of the detection target area calculated in step S13 (step S16).

In step S16, if the x coordinate of the start point of the matching target area (0x) is less than or equal to the horizontal size (AREAW) of the detection target area (step S16:NO), processing proceeds to step S18, and if larger than the horizontal size (AREAW) of the detection target area (step S16: YES), the x coordinate (0x) of the start point of the matching target area is set to "0", the y coordinate (0y) is caused to move the distance of OFFSETY calculated in step S13 (step S17), and processing proceeds to step S18.

In step S18, the processor 150 transmits, to the face detector 160, the relative coordinate values (0x,0y) of the start point of the matching target area set by the processing either in step S15 or S17 (step S18), and the processing of setting the matching target area ends.

Specific Example

The following describes a specific example of operation of the above-described image processing device 100, with reference to the flowcharts shown in FIGS. 8 and 9.

In the following example, the high-resolution image data 1000 shown in FIG. 4 is stored in the image memory 130.

Since in the present example, the detection result received from the moving target detection circuit 140 includes the coordinate value of the area indicating the detected moving object (the area 1010), according to the coordinate value, the processor 150 determines that the blocks containing the moving object (the blocks having the SearchIndexes 7, 8, 11, and 12) are the detection target areas, and specifies, to the face detector 160, the SearchIndexes of the blocks corresponding to the determined detection target area (7, 8, 11, and 12) (step S1 of FIG. 8).

Also, the processor 150 sets the reduction ID (11), transmits the set reduction ID to the face detector 160 (step S2), and processing proceeds to step S3.

The following describes the processing of step S3 with reference to the flowchart shown in FIG. 9.

After determining the reduction ID in step S2, the processor 150 judges whether the current setting is the first setting (step S11), and since the judgment is affirmative in the present example (step S11:YES), sets the relative coordinate values (0x,0y) from the reference pixel of the detection target area for the start point of the matching target area to (0,0) (step S12).

The processor 150 calculates the moving distance (OFFSETX=102 pixels, OFFSETY=22 pixels) corresponding to the reduction ID (11) set in step S2 according to Formula 3 and Formula 4 (step S13).

Also, the processor 150 calculates the size (AREAW=320× 2=640, AREAH=240×2=480) of the detection target area (the area including the blocks having SearchIndexes 7, 8, 11, and 12) (step S14), transmits the starting coordinates (0x=0, 0y=0) of the matching target area set in the processing of step S12 to the face detector 160 (step S18), and ends the processing of step S3 in FIG. 8.

Based on the SearchIndexes (7, 8, 11, and 12) specified in step S1 and the coordinate values (0x=0, 0y=0) of the start point specified in step S3, the scaling circuit 161 of the face detector 160 calculates, according to Formula 5, the address value in the image memory 130 in which the portion of the input image in the matching target area is stored, and reads the portion (corresponding to the block having the SearchIndex 7) of the input image in the matching target area from the image memory 130 (step S4).

Also, the scaling circuit 161 generates a reduced image by reducing the read portion of the input image in the matching target area by the reduction ratio $((1/1.22)^{11}$ corresponding to the reduction ID (11) specified in step S2, and transmits the reduced image to the face detection circuit 162 (step S5).

The face detection circuit 162 matches the template image to the reduced image received from the scaling circuit 161 while moving the template image over the reduced image from the top left pixel to the bottom right pixel by 2 pixels (the thinning amount) at a time, and transmits the result of the matching to the processor 150 (step S6).

For all of the detection target areas determined in step S1, the processor 150 judges whether the matching of step S6 has finished (step S7), and since the matching has not finished in the present example (step S7:NO), processing returns to step S3.

The following describes the processing of step S3.

After determining the reduction ID in step S2, the processor 150 judges whether the current setting is the first matching target area setting (step S11 of FIG. 9), and since the judgment is negative (step S11:NO), the processor 150 causes the x coordinate (0x) of the start point of the matching target area to move the distance of OFFSETX (102 pixels) calculated in step S13 (step S15), and judges whether the starting x coordinate (0x) of the matching target area is larger than the horizontal size (AREAW=640) of the detection target area calculated in step S13 (step S16).

Since in the present example, in step S16, the x coordinate (0x) of the matching target area is less than or equal to the horizontal size (AREAW) of the detection target area (step S16:NO), the processor 150 transmits, to the face detector 160, the starting relative coordinate values (0x=102, 0y=0) of the matching target area set in the processing of step S15 (step S18), and ends the processing of step S3 in FIG. 8.

Hereinafter, similar processing as the above-described steps S4 to S7 is performed for each of the matching target areas starting from a position 102 pixels horizontally from the reference pixels of the detection target area, and in step S7, since the matching is not finished in the present example (step S7:NO), processing returns to step S3.

Thereafter, the processing of step S3 (corresponding to the processing of steps S11, S15, S16, and S18) is repeated, and in step S16, when the x coordinate (0x=714) of the start point of the matching target area is larger than the horizontal size (AREAW=640) of the detection target area (step S16:YES), the starting x coordinate (0x) of the matching target area is set to "0", the y coordinate (0y) is caused to move the offset distance calculated in step S13 (OFFSET=22 pixels) (step S17), the processor 150 transmits, to the face detector 160, the coordinate values (0x=0, 0y=22) of the start point of the matching target areas set in the processing of step S17 (step S18), and ends the processing of step S3 in FIG. 8.

Hereinafter, for the matching target areas set as the start point in the position 22 pixels vertically from the reference pixels of the detection target area, similar processing as the above steps S4 to S7 is performed, and since in the present example the matching is not finished (step S7:NO), processing returns to step S3.

Thereafter, the processing of steps S3 to S7 is repeated, and upon making a judgment in step S7 that the matching has finished (step S7:YES), the processor 150 judges whether the matching of step S6 has finished for all of the reduction IDs (step S8). In the present example, since the matching has not finished for all of the reduction IDs (step S8:NO), processing returns to step S2.

In step S2, the processor 150 sets a value (10) that is one less than the reduction ID (11), transmits the set reduction ID to the face detector 160 (step S2), and processing proceeds to step S3.

The following describes the processing of step S3.

After determining the reduction ID in step S2, the processor 150 judges whether the current setting is the first matching target area setting (step S11), and since the judgment is affirmative in the present example (step S11:YES), the processor 150 sets the relative coordinate values (0x,0y) from the reference pixel of the detection target area for the start point of the matching target area to (0,0) (step S12).

The processor 150 calculates the moving distance (OFFSETX=142 pixels, OFFSETY=62 pixels) corresponding to the reduction ID (10) set in step S2 according to Formula 3 and Formula 4 (step S13).

Also, the processor 150 calculates the size (AREAW=640, AREAH=480) of the detection target area (the area that includes the blocks having the SearchIndexes of 7, 8, 11, and 12) (step S14), transmits, to the face detector 160, the relative coordinate values (0x=0, 0y=0) of the start point of the matching target area set by the processing in step S12 (step S18), and ends the processing of step S3 in FIG. 8.

Thereafter, processing similar to the above-described processing is performed, and in step S8, when a judgment is made that matching has finished for all of the reduction IDs (step S8:YES), the processor 150 integrates the matching results transmitted by the face detection circuit 162 in step S6, specifies the area in which the face image exists in the high-resolution image (step S9), and ends face detection processing.

Embodiment 2

Overview

Although in the description of embodiment 1, the moving object detection circuit 140 performs processing for detecting the moving object, the following describes an example in which the face detector performs the processing to detect the moving object.

In addition to the functions of the face detector 160 pertaining to embodiment 1, the face detector pertaining to the present embodiment attempts to detect the face image at a predetermined spacing interval, for each piece of high-resolution image data stored sequentially in the image memory 130, with use of the entire high-resolution image data as the detection target area.

Hereinafter, "entire detection" refers to detecting the face image with use of the entire high-resolution image data as the detection target area. "Partial detection" refers to detecting the face image with use of a portion of the high-resolution image data as the detection target area, as described in embodiment 1.

When the face image is detected with use of entire detection, the face detector sets the area in which the detected face image is included as a detection target area, and performs partial detection until performing the next entire detection. This enables performing detection by partial detection without greatly increasing the throughput amount, even when the moving object detection circuit 140 is not included.

Also, during entire detection, the face detector furthermore performs processing to match the template image to the entire image of the 4 VGA size high-resolution image data that has been reduced to QVGA size, as the matching target area. This enables detecting a face image that is larger than QVGA size, such as a face image that completely fills the high-resolution image data.

Structure

First, the structure of an image processing device 200 including a face detector 210 pertaining to the present embodiment is described.

Figure 10:
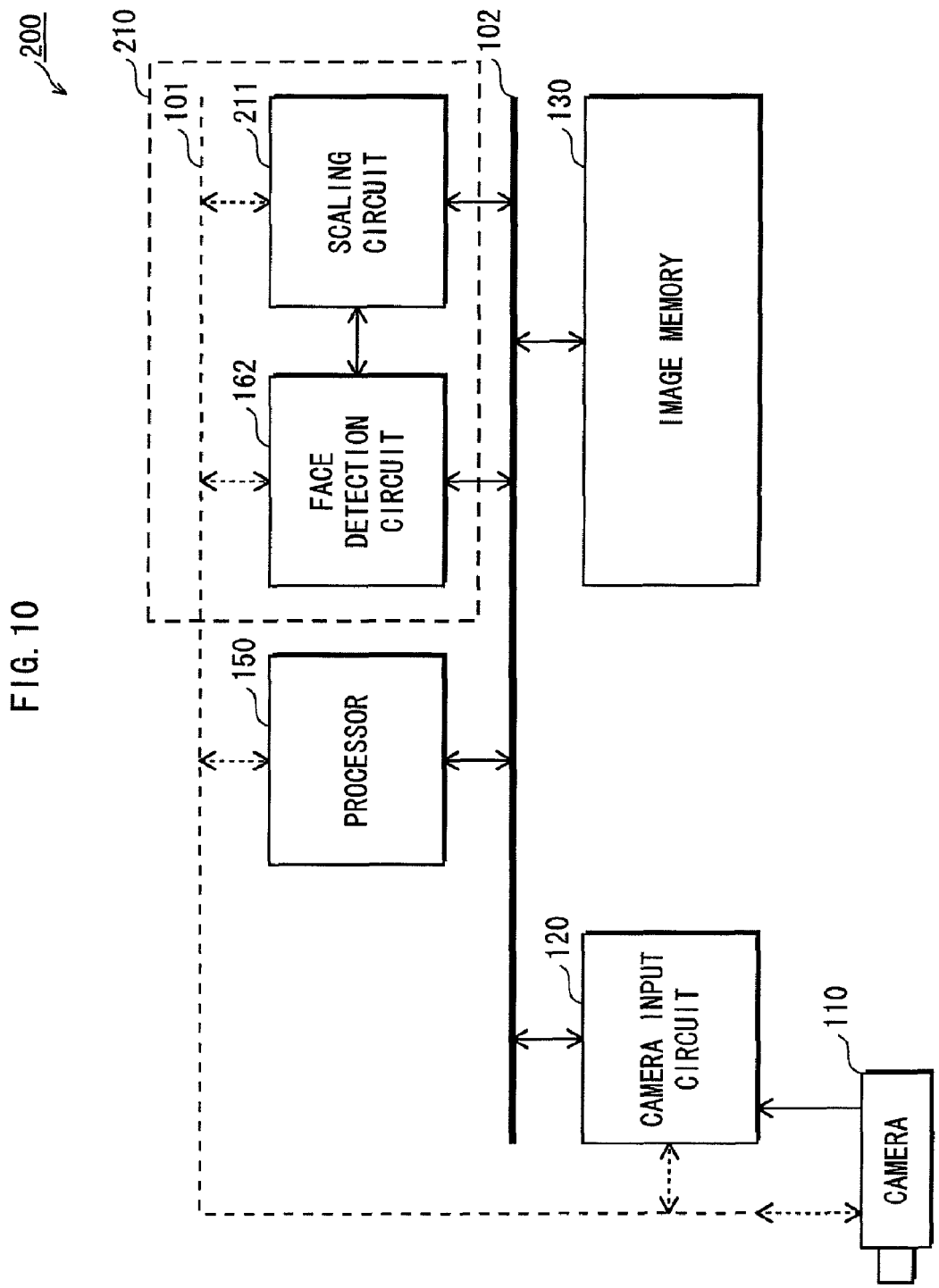
FIG. 10 is a functional block diagram of an image processing device 200.

FIG. 10 is a functional block diagram of the image processing device 200.

As shown in FIG. 10, the image processing device 200 includes the face detector 210 in place of the face detector 160, and does not include the structures from the image processing device 100 to the moving object detection circuit 140. The face detector 210 corresponds to a matching unit and a second matching unit in the present embodiment.

The following description centers on the portions that are different from embodiment 1.

The face detector 210 includes a scaling circuit 211 in place of the scaling circuit 161 in embodiment 1. The scaling circuit 211, in addition to the functions of the scaling circuit 161, further receives an instruction from the processor 150, reduces the entire high-resolution image data, and generates a QVGA-size image. Also, the scaling circuit 211 corresponds to the reduction unit and the second reduction unit in the present invention.

Since the face detection circuit 162 is similar to embodiment 1, description thereof is omitted.

Operation

The following describes the operation of the image processing device 200.

Figure 11:
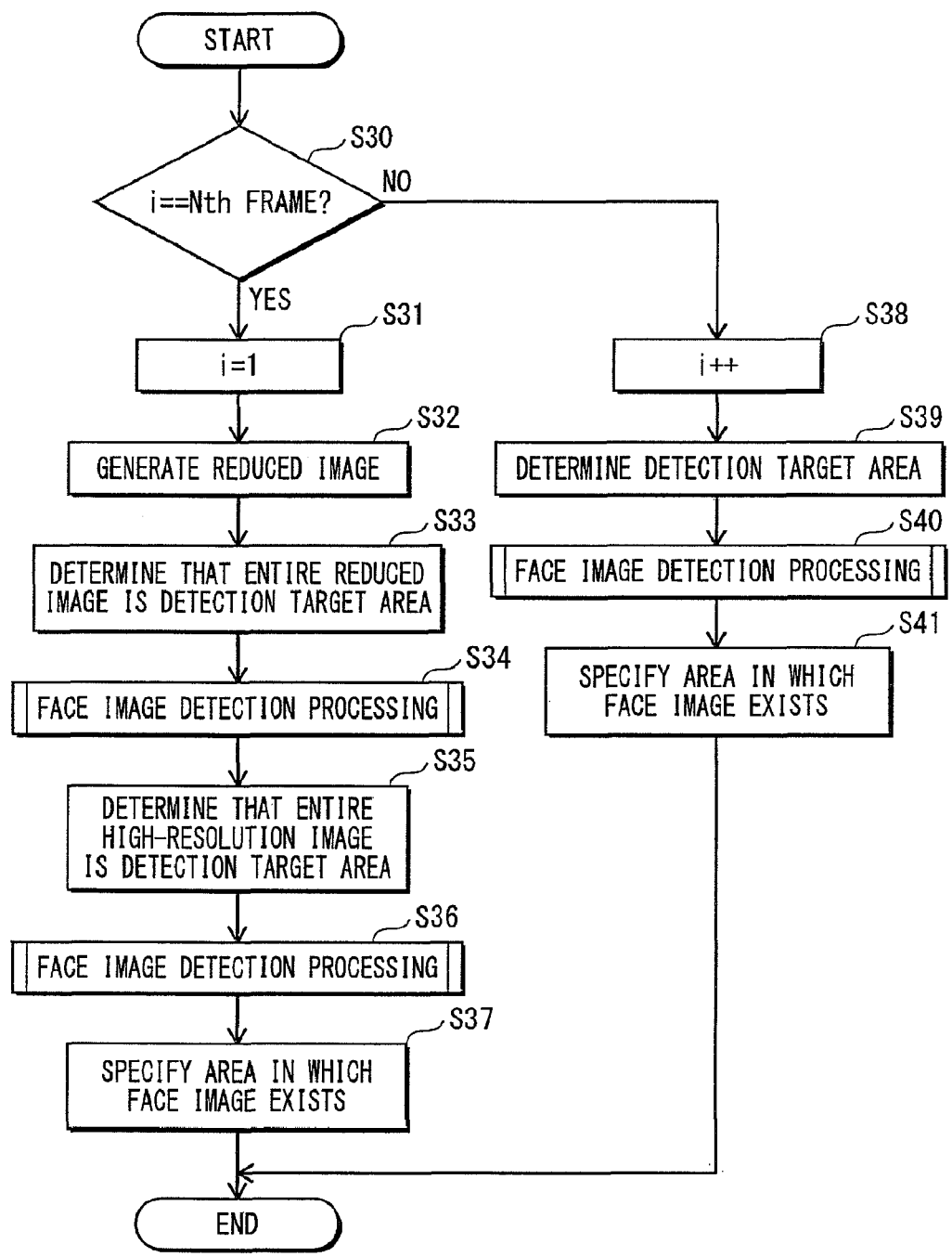
FIG. 11 is a flowchart showing operations of the image processing device 200.

FIG. 11 is a flowchart showing operations of the image processing device 200.

Note that in the following description, "Nth frame" refers to the spacing interval of numbers of pieces (frame number) of high-resolution data for performing entire detection, and the initial value and Nth frame of "i" in FIG. 11 are both 15.

Upon receiving a notification from the camera input circuit 120 that the high-resolution image data has been stored in the image memory 130, in order to judge whether to perform entire detection or partial detection, the processor 150 judges whether the value of "i" is equal to the Nth frame (in the present example, 15) (step S30), and if the value of "i" is equal to the Nth frame (step S30:YES), the value of "i" is set as 1 to perform entire detection (step S31).

The processor 150 transmits an instruction to the scaling circuit 211 to generate a QVGA-size image, and according to the instruction, the scaling circuit 211 reads the high-resolution image data stored in the image memory 130, and reduces the data to QVGA size (step S32).

The processor 150 determines that the entire QVGA-size image data generated in step S32 is the detection target area (step S33). Note that as a method of specifying the detection target area, for example, the entire QVGA-size image data can be specified as the detection target area by specifying a different value (for example 1) from the SearchIndexes (1 to 16) described in embodiment 1.

The processor 150 and the face detector 210 perform the processing of steps S2, S3, S5, and S6 to S8 in the flowchart shown in FIG. 9 (step S34 in FIG. 11). This processing corresponds to the processing of detecting the face image by matching the reduced image that is the image of the QVGA size generated in step S32 reduced by the reduction ID and the template image.

Next, the processor 150 determines that the entire high-resolution image data is the detection target area, and specifies, to the face detector 210, the SearchIndexes (1 to 16) of the blocks corresponding to the determined detection target area (step S35).

The processor 150 and the face detector 210 perform the processing of steps S2 to S8 in the flowchart shown in FIG. 9 (step S36 in FIG. 11). This processing corresponds to performing partial processing similar to the processing described in embodiment 1 by setting the entire high-resolution image data as the detection target area.

The processor 150 specifies an area in which the face image is likely to exist in the high-resolution image data by synthesizing the processing results of steps S34 and S36 (step S37), and ends processing. Note that as a method of specifying the area in which the face image exists, for example, the specification is done by converting the coordinate values included in the matching results into coordinate values in the high-resolution image data, and finding an average value of the coordinate values.

Also, in step S30, when the value of i is not equivalent to the Nth frame (in the present example, 15) (step S30:NO), the value of i is increased by 1 to perform partial detection (step S38).

When the area in which the face image exists has been specified in the processing of step S37 performed immediately previously, the processor 150 determines the blocks including the specified area to be the detection target area, and specifies, to the face detector 210, the SearchIndexes of the blocks corresponding to the determined detection target area (step S39).

The processor 150 and the face detector 210 perform the processing of steps S2 to S8 in the flowchart shown in FIGS. 8 and 9 described in embodiment 1 (step S40 of FIG. 11). This processing corresponds to processing for similarly performing partial detection described in embodiment 1, in that the blocks including the area in the same position as the area in which a face image was detected in the total detection performed immediately previously are set to be the detection target area.

Similarly to the processing of step S9 in the flowchart shown in FIG. 8, the processor 150 integrates the processing results of step S40 in FIG. 11 and specifies an area in the high-resolution image data where the face image exists (step S41), and face detection processing ends.

Specific Example

The following specifically describes the operation of the above-described image processing device 200 with reference to the flowchart of FIG. 11.

In the following example, the high-resolution image data 1000 shown in FIG. 4 is stored in the image memory 130. Note that the image of the area 1010 is a face image, the start point value of "i" in the following description is 15 (initial value), and as described above, the Nth frame is 15.

Processing of First Frame

Upon receiving a notification from the camera input circuit 120 that the high-resolution image data has been stored in the image memory 130, in order to judge whether to perform entire detection or partial detection, the processor 150 judges whether the value of "i" is equal to the Nth frame (in the present example, 15) (step S30), and if the value of "i" is equal to the Nth frame (step S30:YES), the value of "i" is set as 1 to perform entire detection (step S31).

The processor 150 transmits an instruction to the scaling circuit 211 to generate a QVGA-size image, and according to the instruction, the scaling circuit 211 reads the high-resolution image data stored in the image memory 130, and reduces the data to QVGA size (step S32).

The processor 150 determines that the entire QVGA-size image data generated in step S32 is the detection target area (step S33), and specifies SearchIndex=0 to specify this detection target area.

The processor 150 and the face detector 210 perform the processing of steps S2, S3, S5, and S6 to S8 in the flowchart shown in FIG. 9 (step S34 in FIG. 11).

Specifically, the processor 150 sets the reduction ID (11), transmits the set reduction ID to the face detector 210 (step S2 of FIG. 8), and processing proceeds to step S3. The following describes the processing of step S3.

After determining the reduction ID in step S2, the processor 150 judges whether the current setting is the first matching target area setting (step S11 of FIG. 9), and since in the present example, the judgment is affirmative (step S11:YES), the processor 150 sets the relative coordinate values (0x,0y) from the reference pixel of the detection target area for the start point of the matching target area to (0,0) (step S12).

The processor 150 calculates the moving distance (OFFSETX=102 pixels, OFFSETY=22 pixels) corresponding to the reduction ID (11) set in step S2 according to Formula 3 and Formula 4 (step S13).

Also, the processor 150 calculates the size (AREAW=320, AREAH=240) of the detection target area (the SearchIndex is 0, indicating the entire QVGA-size image data generated in step S32) (step S14), transmits, to the face detector 210, the coordinate values (0x=0, 0y=0) of the start point of the detection target area set by the processing in step S12 (step S18), and ends the processing of step S3 of FIG. 8.

Also, the scaling circuit 211 generates a reduced image that is an image of the matching target area (corresponding to the block having the SearchIndex 7) that has been reduced at the reduction ratio $((1/1.22)^{11})$ corresponding to the reduction ID (11) specified in step S2, and transmits the reduced image to the face detection circuit 162 (step S5).

The face detection circuit 162 repeatedly matches the template image to the reduced image received from the scaling circuit 211 while moving the template image over the reduced image from the top left pixel to the bottom right pixel by 2 pixels (the thinning amount) at a time, and transmits the result of the matching to the processor 150 (step S6). Note that if a face image is detected, the matching result transmitted to the processor 150 includes the coordinate values of the area in the reduced image in which the face image was detected.

The processor 150 determines whether the matching of step S6 has finished for the entire detection target area determined in step S1 (step S7). Since in the present example, the matching has finished (step S7:YES), the processor 150 judges whether the matching of step S6 has finished for all of the reduction IDs (step S8), and since in the present example, the matching of step S6 has not finished for all of the reduction IDs (step S8:NO), processing returns to step S2, and resumes with use of the reduction ID (10). Processing is performed as described above.

By decreasing the number of the reduction ID by 1 at a time, the above-described processing is repeated, and when the matching has finished for all of the reduction IDs (step S8:YES), the processing of step S34 in FIG. 11 is finished, and processing proceeds to step S35.

The processor 150 determines that the entire high-resolution image data is the detection target area, and specifies, to the face detector 210, the SearchIndexes (1 to 16) of the blocks corresponding to the determined detection target area (step S35).

The processor 150 and the face detector 210 perform the processing of steps S2 to S8 in the flowcharts shown in FIGS. 8 and 9 (step S36 in FIG. 11) described in embodiment 1. Since this processing is the same as in embodiment 1, description thereof is omitted here.

The processor 150 specifies an area in which the face image is likely to exist in the high-resolution image data 1000 by synthesizing the processing results of steps S34 and S36 (step S37), and ends processing.

Processing the Second Frame

Next, upon receiving a notification from the camera input circuit 120 that the high resolution image data has been stored in the image memory 130, since in step S30, the value of i (1) is not equivalent to the Nth frame (15) (step S30:NO), the processor 150 also increases the value of i by 1 to perform partial detection (step S38).

Since the area in which the face image exists (area 1010) was specified in the processing of step S37 executed immediately previously, the processor 150 determines that the detection target area is constituted from the blocks including that determined area (the blocks having the SearchIndexes 7, 8, 11, and 12), and specifies, to the face detector 210, the SearchIndexes (7, 8, 11, and 12) of the blocks corresponding to the determined detection target area (step S39).

The processor 150 and the face detector 210 perform the processing of steps S2 to S8 in the flowchart shown in FIG. 8 described in embodiment 1 (step S40 of FIG. 11). Since this processing is the same as in described in embodiment 1, description thereof is omitted.

Similarly to the processing of step S9 in the flowchart shown in FIG. 8, the processor 150 specifies the area in the high-resolution image data in which the face image exists by integrating the processing results of step S40 of FIG. 11 (step S41), and ends face detection processing.

Observations

Figure 12:
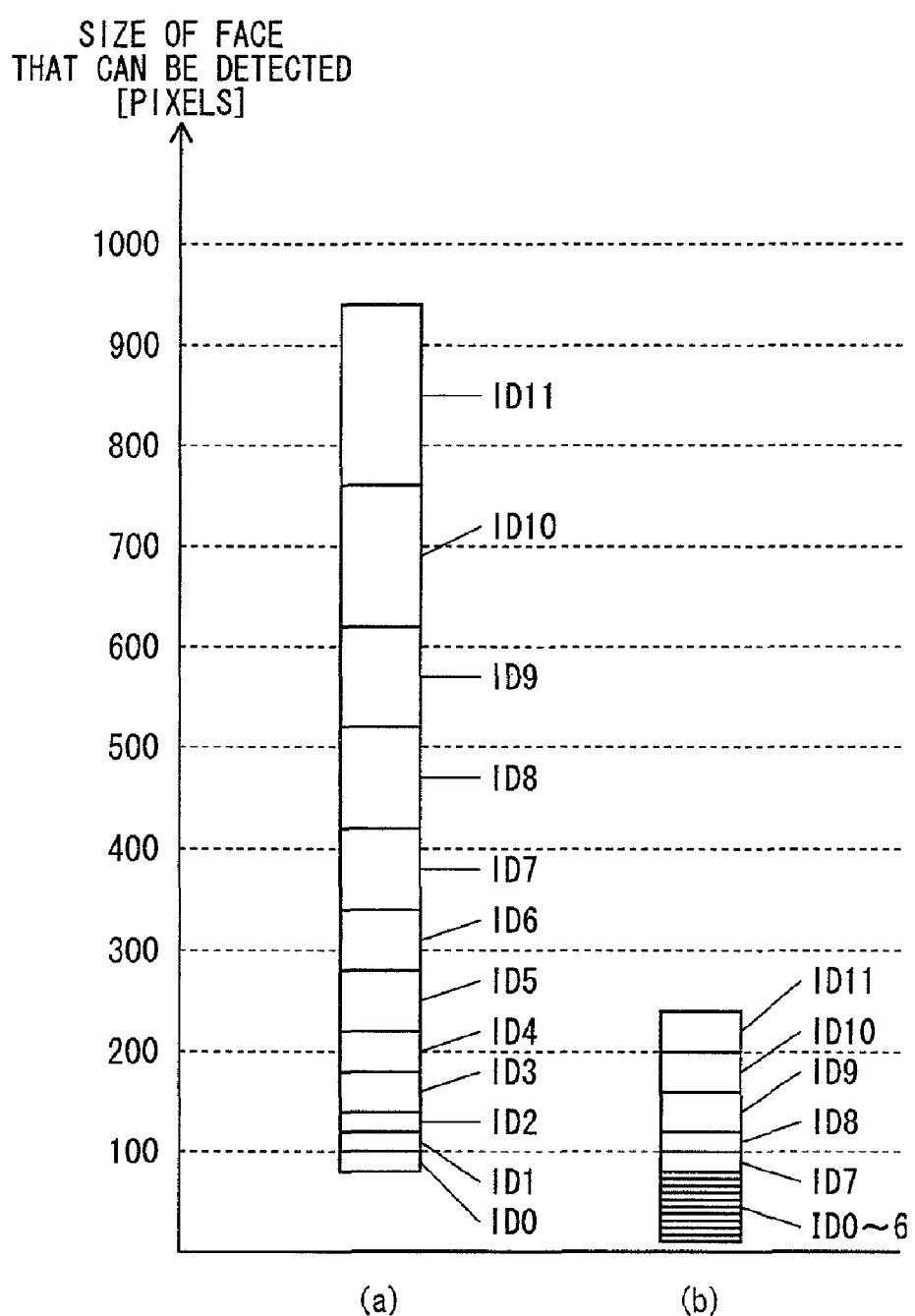
FIG. 12 is a graph indicating sizes of face images that can be detected by a face detector 210.

FIG. 12 is a graph indicating sizes of face images that can be detected by a face detector 210.

In FIG. 12, (A) indicates the sizes of face images that can be detected when the high resolution image data (4 VGA size) has been reduced to QVGA size, and the entire reduced image that has been reduced to QVGA size is considered the matching target area, and (B) indicates the sizes of face images that can be detected when the QVGA size area in the high resolution image data is considered the matching target area. Also, the description in FIG. 12 of IDs 0 to 11, indicates the reduction IDs described in FIG. 3.

When the QVGA size (320×240 pixels) area in the high-resolution image data is set as the matching target area, since a face image that is greater than or equal to QVGA size cannot be detected, the size of a face image that can be detected is less than or equal to 240×240 pixels, as shown in FIG. 12(B).

Meanwhile, when the entire image of the high-resolution image data (4 VGA size (1280×960 pixels)) that has been reduced to QVGA size is set as the matching target area, the size of the face image that can be detected is less than or equal to 960×960 pixels, as shown in FIG. 12(A).

Specifically, the face detector 160 pertaining to embodiment 1 cannot detect a face image larger than 240×240 pixels, since the face detector 160 only uses the method of FIG. 12 (B) to detect the face image. However, the face detector 210 pertaining to embodiment 2 can detect a face image larger than 240×240 pixels.

Also, as described above, when an image of the high resolution image data (4 VGA size) that is reduced to the QVGA size is set as the matching target area, to match the template image to images of the matching target area that have been further reduced according to the reduction IDs, a face image of up to 100 pixels×100 pixels can be detected. In other words, as shown in FIG. 12, since face images from approximately 100×100 pixels to approximately 240×240 pixels can be detected by the method of (A) and the method of (B), when an image of the high-resolution image data (4 VGA size) that has been reduced to QVGA size is set as the matching target area (corresponding to the processing in step S34 of FIG. 11), detection may be performed in the ranges of the reduction IDs 5 to 11. This enables further suppressing the throughput amount used for detecting the face image.

Supplementary Remarks (1) The structures described in the embodiments may be partially or completely realized as a computer program, or as an integrated circuit composed of one chip or a plurality of chips.

Figure 13:
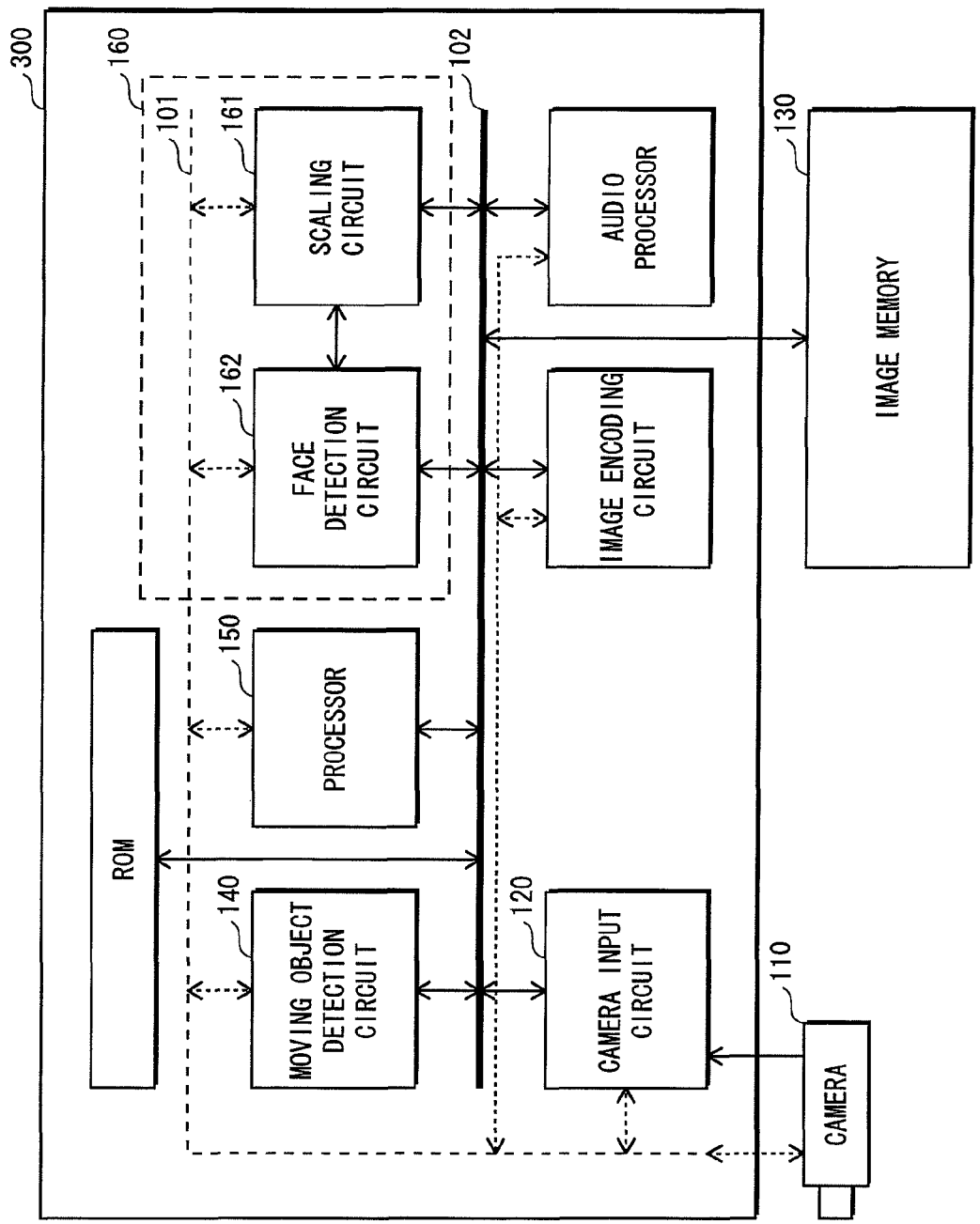
FIG. 13 shows an exemplary structure of a semiconductor integrated circuit 300 including the face detector 160 described in embodiment 1.
Figure 14:
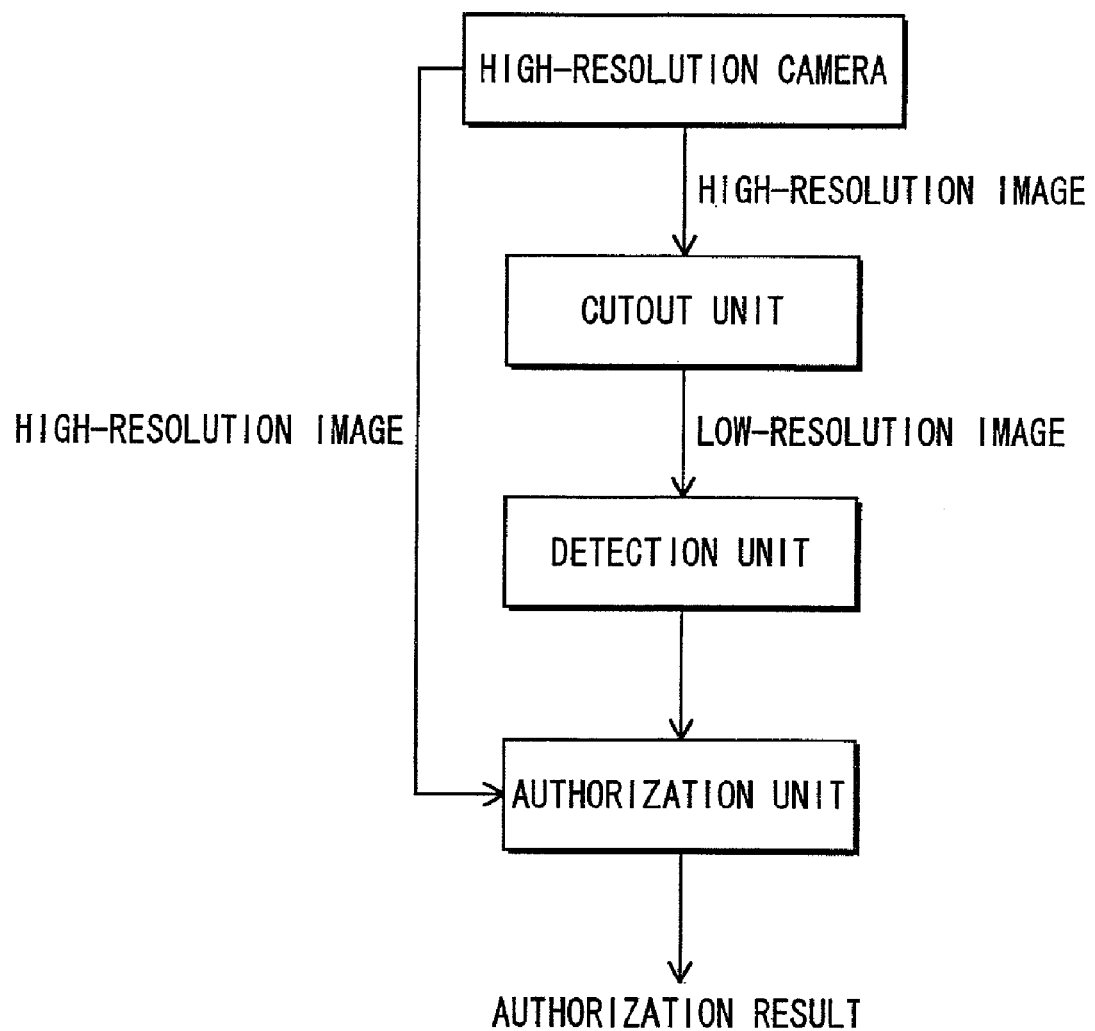
FIG. 14 is a functional block diagram of an image processing device pertaining to patent document 1.
Figure 15:
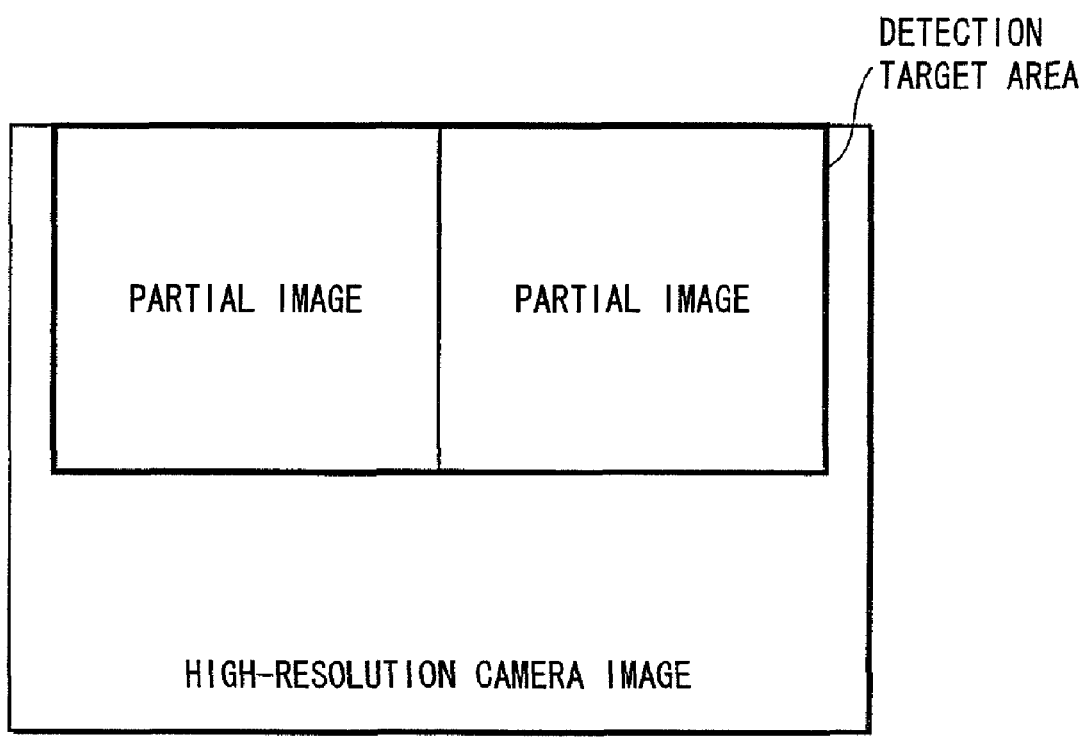
FIG. 15 shows a detection target area in the image processing device pertaining to patent document 1.
Figure 16:
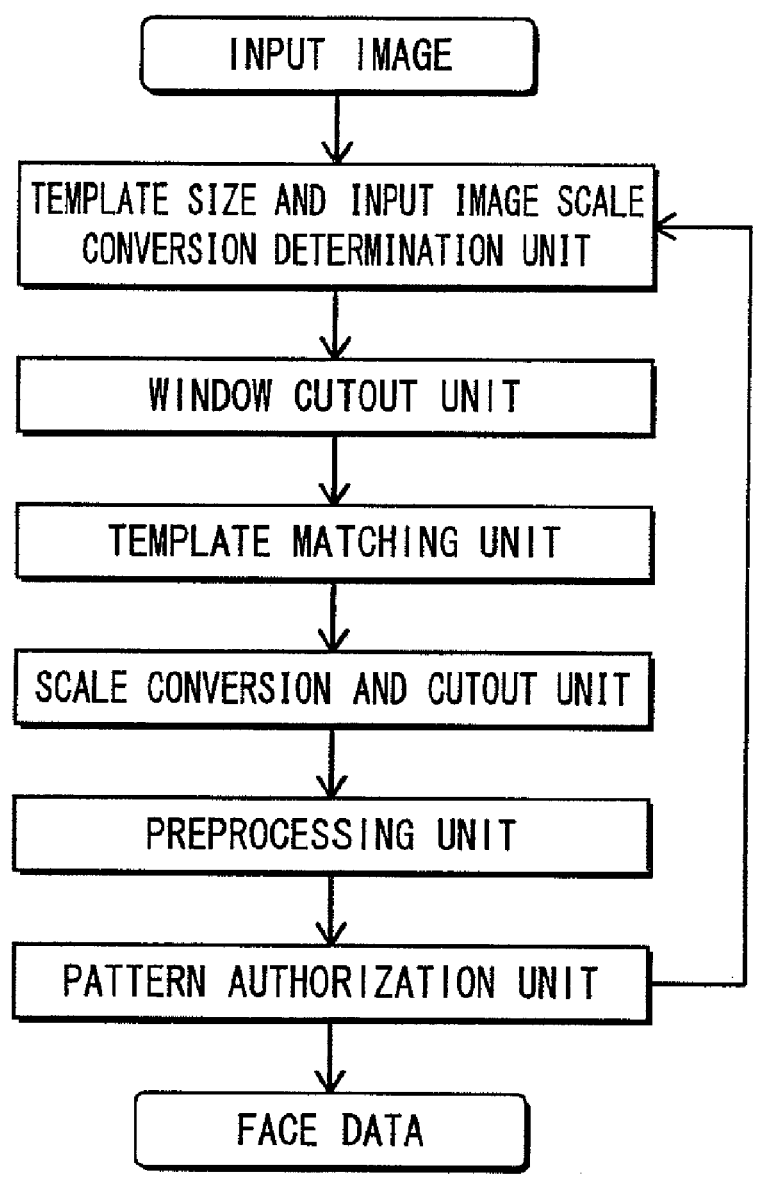
FIG. 16 is a functional block diagram of a face detector pertaining to patent document 2.

FIG. 13 shows an exemplary structure of a semiconductor integrated circuit 300 including the face detector 160 described in embodiment 1.

As shown in FIG. 13, the semiconductor integrated circuit 300 includes a semiconductor integrated circuit corresponding to the face detector 160, and additionally includes an image encoding circuit, an audio processor, and a ROM, etc. for use in a device compatible with the semiconductor integrated circuit 300.

The semiconductor circuit 300 is generally structured as a MOS transistor such as a CMOS, and a specified logic circuit is realized by a structure of connections with the MOS transistor. In recent years, the integration degree of semiconductor integrated circuits has progressed, and since an extremely complicated logic circuit can be realized by one or more semiconductor integrated circuits, the face detector 160 can be made compact, and low energy consumption can be achieved.

Note that the semiconductor integrated circuit 300 has been described as including a semiconductor integrated circuit corresponding to the face detection circuit 160 pertaining to embodiment 1. However, the semiconductor integrated circuit 300 may alternatively include a semiconductor integrated circuit corresponding to the face detector 210 pertaining to embodiment 2.

(2) Although in the embodiments, an example is described of one piece of face image data being included in the high resolution image data, that is, one detection target area, processing may also be performed to detect a face image for a plurality of detection target areas.

(3) Although in the embodiments, the size of the matching target area is described as being QVGA size, and the size of the matching target image is described as being 24×24 pixels, the present invention is not limited to this, and such sizes may be arbitrary. Also, when the size of the matching target area is an arbitrary size, the size of one block also may be an arbitrary size corresponding to the size of the matching target area.

Also, although the high-resolution image data is described as being 4 VGA size, the present invention is not limited to this, and the size may be arbitrary.

(4) Although in the embodiments, the template image is described as being one type, a plurality of template images may be prepared for each orientation of the face image to be detected, and detection may be attempted for the face image by performing the matching with each template image.

(5) Although in the embodiments, the portion of the input image in the matching target area is described as being reduced, when the size of the template image is larger than the size of the portion of the input image, the portion of the input image may be enlarged.

Also, although in the embodiments, the size of the template image is constant, and the portion of the input image in the matching target area is described as being reduced, the portion of the input image in the matching target area may be constant, and the size of the template image may be enlarged or reduced.

(6) In the embodiments, matching is described as being performed in all matching target areas in the detection target area regardless of whether a face image has been detected. However, when a judgment is made that the detection of the face image has been performed according to a predetermined condition (for example, that a degree of coincidence with the template image is greater than or equal to a predetermined threshold), the detection processing may be ended for that piece of high-resolution image data.

(7) Although in the embodiments, the detector is described as detecting a face image, the detector may also detect a specified image other than a face. The specified image may also be, for example, an identification tag attached to a person or thing, and in this case, the specified image may be used to identify a type of individual or thing based on the detected identification tag.

(8) In the embodiments, when a face image is detected, an example is described of the face detector 162 transmitting, to the processor 150, the coordinate values of the area in which the face image was detected in the reduced image included in the detection results. Furthermore, the reduction ID may also be included. Also, the processor 150 may calculate the size of the face image based on the coordinate values and the reduction ID included in the matching results.

(9) In embodiment 1, an example is described of the moving object detection circuit 140 detecting the moving object by matching edge detection results of high-resolution image data in which a moving object is not pictured and high-resolution data stored in the image memory 130. However, this is only an example, and detection may be performed by another method such as by finding a difference between pixel values of successively generated pieces of high-resolution image data.

(10) In embodiment 1, an example is described of the reduction ratio changing by $(1/1.22)^n$ each time as shown in FIG. 3. However, this is only one example, and the reduction ratios may be set to change by another amount, for example $(1/1.25)^n$, so that the size of the image that has been reduced by the smallest reduction ratio (that is, the image having the greatest degree of reduction) is larger than size of the template image.

(11) In embodiment 1, as an operation of the image processing device 100, an example is described of a processing (step S3) loop, for setting the matching target areas, existing in a processing (step S2) loop for setting the reduction IDs as shown in FIG. 8. However, the reverse may be true. Specifically, the processing of step S2 may be replaced by the processing of step S3, and also the processing of step S8 may be replaced by the processing of step S8.

(12) In embodiment 1, in the processing of step S2 shown in FIG. 8, the initial value of the reduction ID is described to be set as "11", and each time the processing of step S2 is performed, the value of the reduction ID is described as decreasing by 1 until reaching 1. However, when processing is performed for all reduction IDs, the processing may be performed in any order. For example, the initial value of the reduction ID may be "0", and each time the processing of step S2 is performed, the value of the reduction ID may be increased until reaching 11.

(13) The face detector 160 pertaining to embodiment 1 has been described as constituted from the scaling circuit 161 and the face detection circuit 162. However, the moving object detection circuit 140 and the processor 150 may be included, in whole or in part, in the face detector 160. In embodiment 2, the processor 150 may also be included in the face detector 210.

(14) In embodiment 1, in the processing of step S13 shown in FIG. 9, the processor 150 is described as calculating a moving distance (OFFSETX, OFFSETY) corresponding to the reduction ID. However, alternatively, a moving distance corresponding to the reduction ID may be pre-stored in an internal memory (not depicted), and the moving distance corresponding to the stored reduction ID may be used.

(15) Although in embodiment 1, the setting processing of the matching target areas shown in FIG. 9 is described as performed by the processor 150, the processing may also be performed by the face detection circuit 160.

(16) Although in embodiment 2, as an operation of the image processing device 200, the entire high-resolution image data shown in FIG. 11 is set as the detection target area (step S35), one block from among the blocks having the Search Indexes 1 to 16 may be selected, in order, as the detection target area each time entire detection is performed. Specifically, for the first entire detection, the block having the SearchIndex 1 is determined to be the detection target area, and for the second entire detection, the block whose SearchIndex is 2 is determined to be the detection target area. This enables further suppressing the throughput.

Also, to improve the precision of detection, when entire detection is performed once, the detection target area may be determined to include a plurality of blocks. For example, the blocks having the SearchIndexes 1 and 2 may be determined to be the detection target area.

(17) Assuming that the area in which the face image exists has been specified by the processing in step S37 that is executed immediately previously, the processing of step S39 shown in FIG. 11 is described in embodiment 2 as determining, based on the specified area, the detection target area to be used when performing partial detection. However, in the processing of step S37, if the area in which the face image exists has not been determined, in other words, if the face image was not detected in the processing of steps S34 and S36, the partial processing of steps S39 to S41 may be performed.

(18) In embodiment 2, as shown in the flowchart of FIG. 11, it was described that when i is 15, entire detection is performed, and when i is from 1 to 14, partial detection is performed. However, alternatively, entire detection may be performed continuously until the face image is detected by the entire detection, and when the face image is detected by the entire detection, the processing may switch to partial detection, and when the face image can no longer be detected by partial detection, processing may switch back to entire detection.

INDUSTRIAL APPLICABILITY

The face detector pertaining to the present invention can be used for detecting a face image in an image taken by a security camera, etc.

The invention claimed is:

1. A detector for detecting a specified image in an input image, comprising:
    an area determination unit operable to determine, in the input image, a detection target area in which the specified image potentially exists;
    a setting unit operable to set positions of a plurality of matching target ranges in the detection target area, each of the matching target ranges being a predetermined size, so that the matching target ranges cover the detection target area, and each matching target range of the plurality of matching target ranges overlaps a neighboring matching target range by a predetermined overlap width;
    a matching unit operable to detect the specified image by matching a portion of the input image encompassed by each matching target range set by the setting unit and a template image for detecting the specified image; and
    a scaling ratio determination unit operable to determine a ratio for the portion of the input image encompassed by each matching target range of the plurality of matching target ranges, wherein
    the setting of the position of each matching target range of the plurality of matching target ranges by the setting unit is performed so that the predetermined overlap width corresponds to the ratio determined by the scaling ratio determination unit, and
    the matching of the portion of the input image encompassed by each matching target range of the plurality of matching target ranges and the template image is performed by the matching unit after a size of the portion of the input image encompassed by the matching target range of the plurality of matching target ranges has been changed according to the ratio determined by the scaling ratio determination unit.

2. The detector of claim 1 wherein
    the detection target area is a square area that is a portion of the input image,
    each matching target range of the plurality of matching target ranges is a square area that is a portion of the detection target area, the ratio for the portion of the input image encompassed by each matching target range of the plurality of matching target ranges is one of a plurality of reduction ratios, the detector further comprises a storage unit operable to store therein information indicating, for each reduction ratio of the plurality of reduction ratios, the overlap width corresponding to the reduction ratio, the determination of the ratio by the scaling ratio determination unit and the setting of the position of each matching target range of the plurality of matching target ranges by the setting unit are performed in accordance with the information stored in the storage unit, and the matching unit includes a reduction unit operable to, for each reduction ratio determined by the scaling ratio determination unit, reduce the portion of the input image by the reduction ratio.

3. The detector of claim 2 further comprising:

a second reduction unit operable to reduce the input image to a same size as a matching target range of the plurality of matching target ranges, so as to generate a reduced input image; and a second matching unit operable to detect the specified image by matching the reduced input image and the template image.

4. The detector of claim 1 further comprising:

a detection unit operable to detect, in the input image, an area in which a moving object is shown, wherein the area determination unit performs the determining of the detection target area based on the area detected by the detection unit.

5. The detector of claim 1 further comprising:

an image input unit operable to receive, in an order of being captured, an input of a plurality of input images sequentially captured by an external camera, wherein the area determination unit, treating a predetermined number of the plurality of input images sequentially captured by the external camera as one unit, determines an entire area of an input image, of the plurality of input images, that is first in the order in each unit to be the detection target area, and when the specified image is detected by the matching unit in the input image that is first in the order, the detection target area of a subsequent input image in the order is determined to include an area that is in an identical position as the entire area in which the specified image has been detected in the input image that is first in the order.

6. A detection method used in a detector for detecting a specified image in an input image, comprising:

an area determination step of determining, in the input image, a detection target area in which the specified image potentially exists;

a setting step of setting positions of a plurality of matching target ranges in the detection target area, each of the matching target ranges being a predetermined size, so that the matching target ranges cover the detection target area, and each matching target range of the plurality of matching target ranges overlaps a neighboring matching target range by a predetermined overlap width;

a matching step of detecting the specified image by matching a portion of the input image encompassed by each matching target range set by the setting step and a template image for detecting the specified image; and a scaling ratio determination step of determining a ratio for the portion of the input image encompassed by each matching target range of the plurality of matching target ranges, wherein the setting step is performed so that the predetermined overlap width corresponds to the ratio determined by the scaling ratio determination step, and the matching step is performed after a size of the portion of the input image encompassed by the matching target range of the plurality of matching target ranges has been changed according to the ratio determined by the scaling ratio determination step.

7. A detection integrated circuit used in a detector for detecting a specified image in an input image, comprising:

an area determination unit operable to determine, in the input image, a detection target area in which the specified image potentially exists;

a setting unit operable to set positions of a plurality of matching target ranges in the detection target area, each of the matching target ranges being a predetermined size, so that the matching target ranges cover the detection target area, and each matching target range of the plurality of matching target ranges overlaps a neighboring matching target range by a predetermined overlap width;

a matching unit operable to detect the specified image by matching a portion of the input image encompassed by each matching target range set by the setting unit and a template image for detecting the specified image; and a scaling ratio determination unit operable to determine a ratio for the portion of the input image encompassed by each matching target range of the plurality of matching target ranges, wherein the setting of the position of each matching target range of the plurality of matching target ranges by the setting unit is performed so that the predetermined overlap width corresponds to the ratio determined by the scaling ratio determination unit, and the matching of the portion of the input image encompassed by each matching target range of the plurality of matching target ranges and the template image is performed by the matching unit after a size of the portion of the input image encompassed by the matching target range of the plurality of matching target ranges has been changed according to the ratio determined by the scaling ratio determination unit.

* * * * *